(12) United States Patent
Matheny et al.

(10) Patent No.: US 11,086,955 B2
(45) Date of Patent: *Aug. 10, 2021

(54) SYSTEMS AND METHODS FOR ENHANCED NETWORKING, CONVERSION TRACKING, AND CONVERSION ATTRIBUTION

(71) Applicant: Verb Technology Company, Inc., Newport Beach, CA (US)

(72) Inventors: Jason R. Matheny, Highland, UT (US); Jason Colby Allen, Pleasant Grove, UT (US); McKinley Oswald, Lehi, UT (US); Jeremy James Oswald, Lehi, UT (US); Daniel Ryan O'Marra, South Jordan, UT (US); Curtis John Gibby, American Fork, UT (US); David A. Skinner, Pleasant Grove, UT (US); Brycen Squire, Draper, UT (US); Alex Dayton Cooper, American Fork, UT (US)

(73) Assignee: Verb Technology Company, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,445

(22) Filed: Nov. 4, 2019

(65) Prior Publication Data

US 2020/0142943 A1    May 7, 2020

Related U.S. Application Data

(63) Continuation of application No. 15/697,348, filed on Sep. 6, 2017, now Pat. No. 10,467,317, which is a (Continued)

(51) Int. Cl.
*H04N 21/20* (2011.01)
*G06F 16/955* (2019.01)
(Continued)

(52) U.S. Cl.
CPC ........ *G06F 16/9558* (2019.01); *G06F 16/958* (2019.01); *G06Q 30/0241* (2013.01);
(Continued)

(58) Field of Classification Search
CPC .... G06F 16/9558; G06F 16/958; G06F 21/10; G06Q 30/0241; G06Q 30/0271;
(Continued)

(56) References Cited

U.S. PATENT DOCUMENTS 6,594,682 B2    7/2003  Peterson et al.
6,834,110 B1 *  12/2004  Marconcini ........... G06F 16/958
                                                380/239
(Continued)

OTHER PUBLICATIONS

Notice of Allowance dated Jul. 5, 2017 for U.S. Appl. No. 14/292,825.
(Continued)

*Primary Examiner* — Le H Luu
(74) *Attorney, Agent, or Firm* — KPPB LLP

(57) ABSTRACT

The present disclosure provides systems and methods for electronically providing each of a plurality of content distributors with access to a library of content items, facilitating the selection of a combination of the content items, creating a unique set of links for each recipient-distributor combination, and distributing the selected content and unique links via one or more distribution channels to a plurality of recipients. As each link is associated with both a recipient and a distributor, conversion actions stemming from the selection of a link by a recipient are attributed to the proper distributor. Distributors can create content distribution approaches that can be shared with other distributors.

22 Claims, 28 Drawing Sheets

Related U.S. Application Data continuation of application No. 14/292,825, filed on May 31, 2014, now Pat. No. 9,792,380.

(51) Int. Cl.
  *G06Q 30/02* (2012.01)
  *G06F 16/958* (2019.01)
  *H04L 12/58* (2006.01)

(52) U.S. Cl.
  CPC ....... *G06Q 30/0271* (2013.01); *H04L 51/066* (2013.01); *H04L 51/18* (2013.01); *H04L 51/34* (2013.01); *H04N 21/20* (2013.01)

(58) Field of Classification Search
  CPC ....... H04L 51/066; H04L 51/18; H04L 51/34; H04L 63/0428; H04N 21/20; H04N 21/485; H04N 21/6547; H04N 7/17336; H04H 20/10
  See application file for complete search history.

(56) References Cited

U.S. PATENT DOCUMENTS

| | | | |
|---|---|---|---|
| 7,945,634 | B1 | 5/2011 | Huda |
| 8,583,683 | B2 | 11/2013 | Rathod |
| 9,792,380 | B2 | 10/2017 | Matheny et al. |
| 10,467,317 | B2 | 11/2019 | Matheny et al. |
| 2003/0135464 | A1* | 7/2003 | Mourad ............ G06F 21/10 705/50 |
| 2007/0124769 | A1* | 5/2007 | Casey ............... H04H 20/10 725/46 |
| 2007/0220575 | A1* | 9/2007 | Cooper ............. H04N 7/17336 725/118 |
| 2009/0125413 | A1 | 5/2009 | Le Chevalier et al. |
| 2011/0112899 | A1 | 5/2011 | Strutton et al. |
| 2011/0289419 | A1* | 11/2011 | Yu ................ H04N 21/485 715/738 |
| 2011/0314101 | A1 | 12/2011 | Redmon et al. |
| 2012/0066082 | A1 | 3/2012 | Sadler |
| 2012/0197995 | A1 | 8/2012 | Caruso |
| 2012/0289147 | A1* | 11/2012 | Raleigh ............ H04N 21/6547 455/3.06 |
| 2013/0006980 | A1 | 1/2013 | Frumin |
| 2013/0055128 | A1 | 2/2013 | Muti et al. |
| 2013/0073381 | A1 | 3/2013 | Binkley |
| 2013/0179510 | A1 | 7/2013 | Hull et al. |
| 2013/0262188 | A1 | 10/2013 | Leibner et al. |
| 2013/0276049 | A1 | 10/2013 | Yamagishi |
| 2014/0223573 | A1* | 8/2014 | Reedy ................ H04L 63/0428 726/26 |
| 2015/0346917 | A1 | 12/2015 | Matheny et al. |
| 2017/0371971 | A1 | 12/2017 | Matheny et al. |

OTHER PUBLICATIONS

"Powerful Social Media Scheduling Software for Business", HoutSuite Media, Inc., Printed May 20, 2014, p. 1.

"Schedule and Automate Your Social Publishing", Sprout Social, Printed May 20, 2014, pp. 1-3.

Halder, "6 Tools to Auto Schedule and Cross Post on Facebook, Twitter, and Google Plus", Make Tech Easier, Printed May 20, 2014, pp. 1-7.

* cited by examiner

| | | | Content | Date |
|---|---|---|---|---|
| Fewer ▬▬▬ More ☑ Generic Quotes/Industry Facts Images (50 Posts) | ▦ | Fracasos Famosos (ESP/SPAN) [Generic] | Les Brown - Limitations | 29 May 2014 12:19 pm |
| Fewer ▬▬▬ More ☑ Motivational Quotes (163 Posts) | ▦ | Quotes/Industry Facts Images [Generic] | Columbus - Courage | 30 May 2014 12:19 am |
| ☐ Motivational Quotes (Portuguese) (34 Posts) | ▦ | Supplements [Company-Specific] | Mercato anti-inflammatory and antioxidant compounds may help protect the brain and support healthy mental and cognitive function. | 30 May 2014 12:19 pm |
| ☐ Os Ibuicos (The Crazy Ones – Portuguese (20 Posts) | ▦ | Supplement Images [Generic] | Supplement makes getting out of bed worth it. | 31 May 2014 12:19 pm |
| ☐ Own Your Life (15 Posts) | ▦ | Famous Failures [Generic] | Soichiro Honda | 1 Jun 2014 12:19 pm |
| ☐ The Crazy Ones Campaign (20 Posts) | | | | |
| ☑ Weight Loss (44 Posts) Fewer ▬▬▬ More | ▦ | Generic Quotes/Industry Facts Images [Generic] | Surround Yourself With Those That Motivate You. | 1 Jun 2014 12:19 am |
| ☑ Weight Loss Articles (9 Posts) Fewer ▬▬▬ More | ▦ | Famous Failures [Generic] | Not eating breakfast seems a simple way to reduce some calories, but the result may be insatiable hunger for the rest of the day. | 2 Jun 2014 12:19 am |
| Company-specific Post Categories (5) | | | | |
| ☑ Mercato Drinks (145 Posts) Fewer ▬▬▬ More | ▦ | Generic Supplement [Generic] | Dozens of studies have prompted health experts to recommend Supplement be part of an overall healthy diet. | 2 Jun 2014 12:19 pm |
| ☑ Mercato Supplement Image (40 Posts) Fewer ▬▬▬ More | | | | |

Curtis Jones | Admin | Log Out

Select Language ▼

Home | Contacts ▼ | Prospecting ▼ | Prospecting | Social Tools ▼ | My Sites ▼ | My Business ▼  My Profile ▼ | Training ▼ | Support ▼

SOCIAL TOOLS

These updates are automatically posted to your Media Posting account or Social Texting account. You can customize which categories of posts are sent, how often they're posted, and the ratio of specific invitations back to your My Local System site versus general information content.

Auto Post | Manual Post | History | Networks

MANUAL POSTS

SAMPLE OF POSTS

| CATEGORIES | | Favorite | Post | | Share |
|---|---|---|---|---|---|
| View All | ⊞ | | | | |
| ★ Favorites | | | | | |
| Cites De Motivacion (Motivational Quotes--SP) | ⊞ | ★ | Mercato perfect combination of product, science, timing, company, and compensation delivers an opportunity unrivaled by any other. | 📎 | ✉ 👍 |
| Citazioni Motivazionali (Motivational Quotes--IT) | ⊞ | ★ | The Mercato compensation plan could be your avenue to increased income and lifestyle security. With 8 lucrative ways to earn, Mercato pays 50% back to its distributors, making this opportunity not only delicious but also very profitable. | 📎 | ✉ 👍 |
| Dichos Famosos II (ESP/SPAN) | ⊞ | ★ | | 📎 | ✉ 👍 |
| Famous Failures | ⊞ | ★ | Mercato's expansive new 175,000 sq-foot corporate facility is an indicator of the company's success and its commitment to its distributors. | 📎 | ✉ 👍 |
| Fracasos Famosos II (ESP/SPAN) | ⊞ | ★ | Timing is key to success in virtually any business. And within the health and wellness industry, it is no different. | 📎 | ✉ 👍 |
| Generic Supplement | ⊞ | ★ | Experts are indicating that healthy Supplement is poised for massive growth in the wellness industry over the next decade. | 📎 | ✉ 👍 |
| Generic Supplement Images | | | | | |
| Generic Health Facts | | ★ | 61% of Americans say they would like to be their own boss-with Mercato that dream can become a | 📎 | ✉ 👍 |
| Generic Health Facts | | | | | |
| Generic Opportunity | | | | | |

Social Blast Campaigns first | << | >>

Page 1 of 1, showing 18 records out of 18 total, starting on record 1, ending on 18

My Mercato - May 2014 Promo — Posted: 5 May 2014 9:00 am

Statistics

| Editable? | Social Drip Item | Queued | Successful | Engaged | Clicks | Click per Engaged | Click per Post |
|---|---|---|---|---|---|---|---|
| No | May 2014 Promo | 346 | 189 | 171 | 527 | 3.08 | 2.79 |

Post Success

Posts Engaged

My Mercato - May 2014 Promo — Posted: 5 May 2014 9:00 am

Statistics

| Editable? | Social Drip Item | Queued | Successful | Engaged | Clicks | Click per Engaged | Click per Post |
|---|---|---|---|---|---|---|---|
| No | May 2014 Promo | 373 | 368 | 295 | 3247 | 11.01 | 8.82 |

Post Success

Posts Engaged

My Mercato - May 2014 Promo — Posted: 1 May 2014 5:00 pm

SYSTEMS AND METHODS FOR ENHANCED NETWORKING, CONVERSION TRACKING, AND CONVERSION ATTRIBUTION

CROSS-REFERENCE TO RELATED APPLICATIONS

The present application is a continuation of U.S. Non-Provisional patent application Ser. No. 15/697,348, filed Sep. 6, 2017 and titled "SYSTEMS AND METHODS FOR ENHANCED NETWORKING, CONVERSION TRACKING, AND CONVERSION ATTRIBUTION", which is a continuation of U.S. Non-Provisional patent application Ser. No. 14/292,825, filed May 31, 2014 and titled "SYSTEMS AND METHODS FOR ENHANCED NETWORKING, CONVERSION TRACKING, AND CONVERSION ATTRIBUTION," which are hereby incorporated by reference in their entireties.

TECHNICAL FIELD

This disclosure relates to systems and methods for communicating via various digital means including social media, email, and SMS and tracking the results of such communication. Specifically, this disclosure relates to digital communication networking with bi-directional tracking and multi-user attribution for conversions.

SUMMARY

This disclosure includes, but is not limited to, various embodiments of systems and methods for electronically providing each of a plurality of content distributors with access to a library of content items. In various embodiments, a content distributor may select a combination of the content items to create a custom content selection. A unique set of links may be created for each recipient-distributor combination. The links may be created such that each link is associated with a specific content distributor, a specific recipient, and the chosen content selection.

In various embodiments, the system allows the custom content and the associated links to be distributed via a distribution channel (e.g., email, text, social media, etc.) to various recipients. By tracking the various links, the system can identify which recipients select or follow a link, perform related action, and/or perform a conversion action, such as a purchase of a good or service. A conversion action may include other things like visiting a home, asking for more details, applying for a loan, applying for a job, etc. Various examples of conversion actions are provided herein.

The links allow for bi-direction tracking in that a conversion action performed by a recipient can be traced back to the content distributor responsible for the conversion action. Even in a multi-user system, the system can determine which of a plurality of content distributors deserves credit for each conversion action or even each click-through.

A report may be generated comparing one or more content distributors, the approach to content distribution (e.g., the schedule, amount, timing, etc.), the actual content sent, the distribution channel(s) used, a characteristic of the recipient, and/or other attributes. In some embodiments, a report may offer a suggestion for changing a content distribution approach (content, timing, distribution channel, etc.) and/or indicate on its face which content distribution approach is working best for a particular content distributor and/or set of recipients.

In various embodiments, the systems and methods described herein may include receiving one or more revised content distribution approaches for subsequent distribution via one or more distribution channels. In various embodiments, one or more of the described modules, methods steps, or the like may be integrated into the websites and/or sales programs of existing companies. In various embodiments, the described systems and methods may be implemented by a single computing device. In other embodiments, one or more modules or method steps may be performed or substantially performed by two or more separate computing devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates one embodiment of a graphical user interface (GUI) of a system for enhancing personal digital networking with bi-directional tracking and multi-user attribution for conversion actions.

FIG. 10 illustrates one embodiment of a GUI for selecting content from a library of content for distribution via one or more distribution channels according to a defined distribution schedule.

FIG. 11 illustrates one embodiment of a GUI for authorizing and enabling one or more distribution channels, including social media, SMS, and email distribution channels.

FIG. 12 illustrates one embodiment of a GUI for creating manual posts with one or more content items from a library of content for distribution via one or more distribution channels.

FIG. 13 illustrates one embodiment of a GUI for navigating through the content items within the library of content items for distribution via the one or more distribution channels.

FIG. 17 illustrates one embodiment of a GUI for allowing a distributor to create customized distributor content items using one or more content items from a library of content items.

FIG. 18 illustrates one embodiment of a GUI for viewing and editing a customized distributor content item based on original distributor content and content items from the library of content items.

FIG. 19 illustrates one embodiment of a GUI for reporting and reviewing the effectiveness of social blast campaigns where content items and traceable links have been shared by one or more content distributors with a large number of recipients via one or more distribution channels.

DETAILED DESCRIPTION

Figure 1:
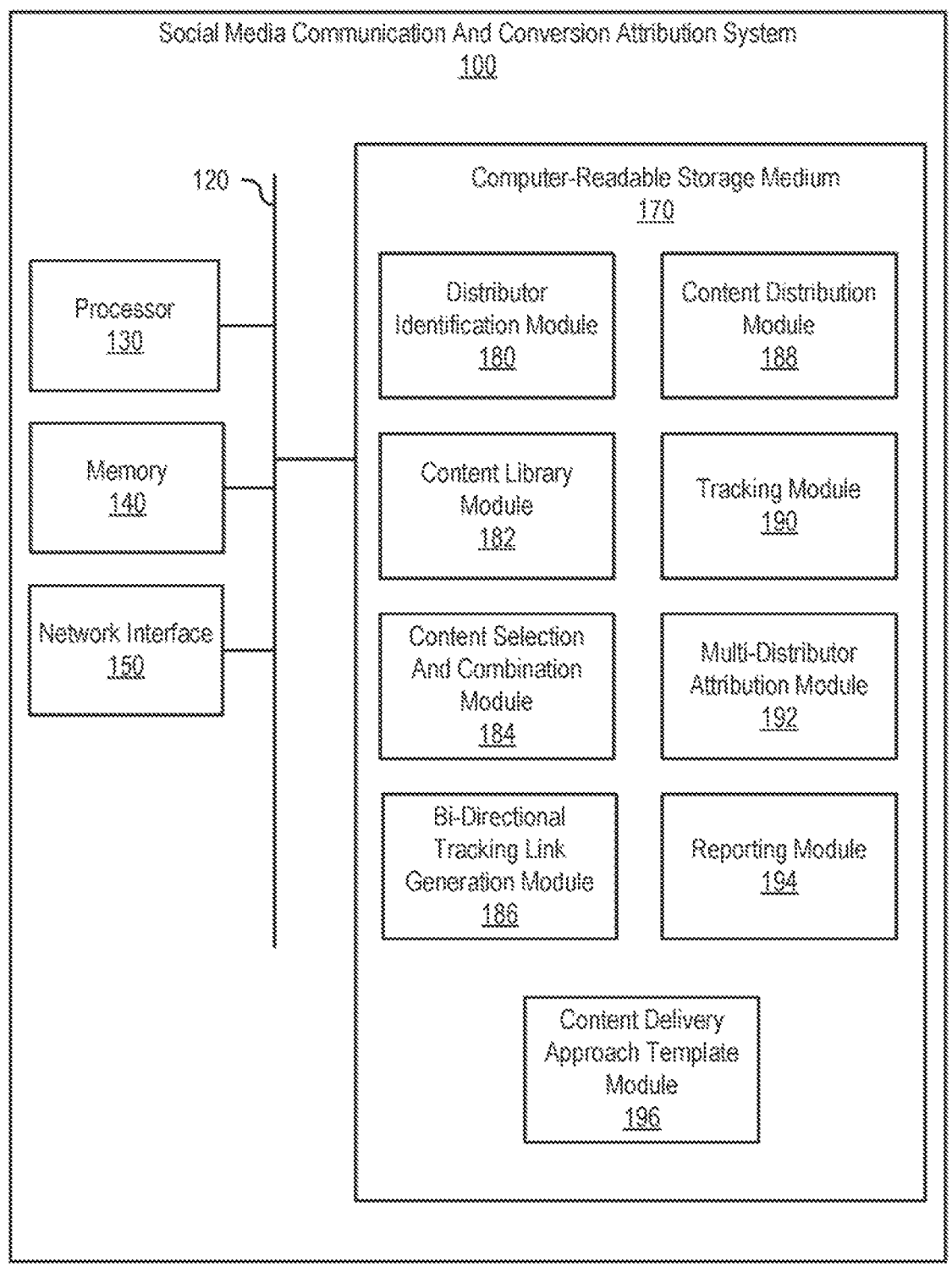
FIG. 1 is a block diagram of one embodiment of a system according to one embodiment of the present disclosure.

This disclosure includes various embodiments of systems and methods for electronically providing each of a plurality of content distributors with access to a library of content items, allowing for scheduled distribution via various distribution channels to multiple recipients, and providing bi-directional tracking of click-through and conversion actions by recipients and their successors (e.g., a person to whom a recipient forwards a link). Various embodiments and variations of these systems and methods are provided herein and are referred to as the "V2 system" and the operations, method steps, functional modules and related components may be interchangeably referred to herein as V2 operations, V2 method steps, V2 functional modules, and V2 components. Additional attributes, embodiments, components, and variations of the V2 systems and methods are described herein.

The bi-directional tracking allows for click-throughs and other conversion actions to be attributed to the correct content distributor and to provide compressive analytics relating to the combination of content distributed, the content distributor, scheduling settings, distribution channels, click-through rates, recipient demographics, conversion actions, and the like.

In various embodiments, links may be created and distributed with and/or included within the custom content selection by a distributor. Each link may provide access to external content, direct a recipient to external content, and/or allow for embedded content to be included in the custom content. For example, the custom content may include text with missing images and a link may be provided to allow the recipient to download the images for embedding into the custom content selection. In other embodiments, the links may provide access to any of a wide variety of downloadable content, such as videos, images, articles, documents, audio files, and the like. In some embodiments, the links may direct a recipient to a universal resource locator (URL). The URL may provide access to a webpage, purchasing options, videos, images, articles, documents, audio files, information request forms, a file transfer protocol (FTP) Internet protocol (IP) address, and/or the like.

Content distributors may access the content items within the library of content via a webpage, a custom application, and/or an application specific device. In various embodiments, the library of content items may be stored in network communication with a server that provides a graphical user interface (GUI) for the systems and methods described herein. In some embodiments, the enhanced networking system and associated GUI may provide content distributors with access to a library of content that is stored in a disparate location and/or even a local data storage of the content distributor.

The library of content may include content items that include text, images, videos, articles, URL links, messages, advertisements, notices, testimonials, and/or any other informational content that may be of interest to a recipient. A content distributor may combine various content items from the library of content to create a customized distributor content item. In various embodiments, the content distributor may further customize one or more of the content items and/or add custom content with personalized inputs.

As described above, a content distributor may select any combination or permutation of the content items to create a custom content selection. Such combination and/or permutations of content items may include actual content items, personal customization, scheduling permutations, distribution channel permutations, sets and subsets of recipients, and the like.

As used herein, the term content distributor is used in a broad sense of any person or entity that is distributing information regarding a product, idea, political platform, and/or service, including the sale or promotion of such products, ideas, political platforms, and/or services. Accordingly, a content distributor may be, but is not limited to, a salesperson, a realtor, a broker, a banker, a product distributor, a direct sales product distributor, a political candidate, a political activist, a political agent, a marketing agent, a business entity, and/or any subset, agent, representative, or associate of any of the above. Similarly, the term "recipient" is used in a broad sense as any person, entity, group of persons/people, and/or group of entities. For example, content distributor may be said to distribute content to a recipient by posting content on a Facebook wall, in which case the recipient may be a group or set of individual that have access to view the content distributor's Facebook wall.

As described herein the V2 systems and methods may create or allow content distributors to selectively create a unique set of links, such that a unique link is created for each content distributor-recipient combination. That is, each of a plurality of content distributors may distribute content to a plurality of recipients. The plurality of recipients of each of the content providers may overlap in that a given individual may be the recipient of customized distributor content from more than one content distributor and/or through more than one distribution channel.

The V2 systems and methods may create and distribute at least one unique link for each permutation of a content distributor, recipient, distribution channel, and/or customized distributor content combination. According to various embodiments, each link is selectable by a recipient and/or their successors (e.g., entities to whom the recipient forwards a link) and each link is traceable.

In various embodiments, the V2 system allows the custom content and the associated links to be distributed via one or more distribution channels (e.g., email, text, social media, etc.) to any number of recipients. A content distributor may select a predefined distribution schedule and/or customize the distribution schedule. In some embodiments a content distributor may select a distribution schedule defined by a team leader, as described in greater detail below. By tracking the various links, the V2 system can identify which recipients select or follow a link, perform a related action, and/or perform a conversion action.

A conversion action may include any of a wide variety of actions and includes, but is not limited to, visiting a home, buying a product or service, asking for more details, applying for a loan, making a purchase, applying for a job, providing personal information, subscribing to a list, signing a document, subscribing to a promoted idea or political platform, signing a contract, and/or any other action desired by the content distributor.

As a specific example, a plurality of direct sales distributors of a product for a company X may each use the V2 system to create a customized distributor content item by combining one or content items from an accessible library of content items. Each of the direct sales distributors may then indicate through which distribution channels (e.g., email, Facebook, Twitter, other social media sites, SMS, MMS, etc.) they would like to share their customized distributor content item with one or more recipients per content distributor. The V2 system may embed unique V2 links into the customized distributor content item, make all or part of the customized distributor content time available through one or more unique V2 links, and/or add unique V2 links to each customized distributor content item. In any event, each recipient receives the customized distributor content item prepared by the direct sales distributor and may or may not select the associated/corresponding V2 link.

Some distribution channels allow content to be distributed directly to each a plurality of known recipients. For example, email systems allow for communication from a single content distributor to a plurality of known recipients. Similarly, Twitter allows for direct messages to discrete recipients, LinkedIn allows for discrete messages to be sent to each recipient, and many other content distribution channels allow for similar discrete communications. In these situations, the V2 system may know, because each of the V2 links is bi-directionally traceable, which recipient received the selected V2 link and which direct sales distributor sent the selected V2 link. If the selection of the link was by itself a conversion action, the conversion action may be attributed to the proper direct sales distributor. If the recipient performs some other conversion action in connection with selecting the V2 link, the credit may be attributed to the proper direct sales distributor.

Other distribution channels may allow content to be distributed to a broad spectrum of unique recipients. For example, Facebook allows a content distributor to post content on a "wall" that is visible to anyone or an authorized subset of recipients. However, the content distributor may not know which specific recipients have accessed or otherwise viewed the distributed content. In these situations, the V2 system may not create distinct V2 links for each recipient, as the number of recipients and their identities may be unknown. However, it may associate each V2 link with the appropriate direct sales distributor and keep track of which direct sales distributor sent the selected V2 link. If the selection of a V2 link was by itself a conversion action, the conversion action may be attributed to the proper direct sales distributor. If the recipient performs some other conversion action in connection with selecting the V2 link, the credit may be attributed to the proper direct sales distributor.

Some distribution channels may allow for broad spectrum posting and discrete communications to specific recipients. Content distributors and/or the V2 system may use such distribution channels for broad spectrum posting and/or discrete communications to specific recipients. In both cases, the V2 system may create a plurality of electronically selectable unique links that are each associated with (1) a corresponding content distributor, (2) a corresponding unique content selection made by the corresponding content distributor, and (3) a corresponding recipient or recipients as the case may be depending on whether the distribution channel allows for discrete distribution to individual recipients or only broad distribution to an identified or even unidentified group of recipients.

As provided above, the links created by the V2 system may allow for bi-directional tracking in that a conversion action performed by recipient can be traced back to the content distributor responsible for the conversion action. Even when multiple content distributors are using the V2 system, the bi-directional links allow the V2 system to both track the actions performed by each recipient over time and attribute such actions (or non-actions) to the proper content distributor. For example, the V2 system can determine which of a plurality of content distributors deserves credit for each conversion action or even each click-through.

In various embodiments, the V2 system may generate a report that compares the one or more content distributors, the approach to content distribution (e.g., the schedule, amount, timing, etc.), the actual content sent, the distribution channel(s) used, a characteristic of the recipient, and/or other attributes. In some embodiments, a report may offer a suggestion for changing a content delivery approach (content, timing, distribution channel, etc.) and/or indicate on its face which content delivery approach is working best for a particular content distributor and/or set of recipients.

As used herein the term "content delivery approach" may include variations in one or more of the content distributed, the distribution schedule, the recipients, the distribution channel(s), and/or permutations thereof.

In various embodiments, content distributors may be organized hierarchically, organized in teams, and/or otherwise cooperate. In various embodiments, a content distributor may wish to share a particular content delivery approach with one or more other content distributors. For example, a first leader content distributor may identify a content delivery approach that includes specific content being transmitted via a specific distribution channel. The leader content distributor may share the content delivery approach with one or more other content distributors. One of these other content distributors may log into the V2 system and select the leader's content delivery approach and the V2 system may distribute content to the recipients in the contact lists of that content distributor.

As in other embodiments, this content distributed in connection with the leader's content delivery approach may include the V2 links to provide bi-directional tracking and attribution for conversion actions. In some embodiments, the V2 links provided in association with a leader's content delivery approach may also be associated with the leader content distributor, such that conversion actions may also be attributed or partially attributed to the leader content distributor in addition to the content distributor that actually distributed the content.

Specific embodiments of the V2 system and methods are described below with reference to the drawings, including representative embodiments of GUIs for interacting with various portions of a V2 system. It is appreciated that any number of variations may be made to the specific GUI embodiments that are illustrated.

Throughout this disclosure, well-known structures, materials, or operations are not shown or described in detail to avoid obscuring aspects of this disclosure. For instance, while many of the features and functionalities of the V2 system are described in terms of user interaction through a GUI, in some embodiments, the interaction with the V2 system may be facilitated through one or more application programming interfaces (APIs).

In such embodiments, external entities, computer systems, and electronic components such as databases, libraries, and the like, may interact with the V2 system to utilize one or more of the functionalizes of the V2 systems and methods described herein via an API that includes specifications for variables, routines, data structures, object classes, content types, sizes, and other interaction details. APIs are generally understood by those of skill in the art and the various functionalities and variations of APIs known to those of skill in the art are within the scope of this disclosure. Integration of the V2 system with existing customer websites, customer relationship management (CRM) tools, databases, shopping carts, inventory analysis systems, analytic generation tools, fulfillment tools, and other electronic systems in an e-commerce or related industry may be facilities through the use of one or more APIs.

Embodiments and implementations of the V2 systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell, Microsoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, PHP, .Net, database languages. APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. That is, this disclosure includes every combination and permutation of the various embodiments and functionalities described herein, including permutations and combinations that are mutually exclusive inasmuch as they may be harmonized and/or used at discrete time intervals.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram of one embodiment of a digital communication and conversion attribution system (also referred to herein as the "V2 system") 100 that includes various modules 180-196 for performing some of the functions described herein. As illustrated, a processor 130 may be in communication with a memory 140, a network interface 150, and/or a computer-readable storage medium 170 (e.g., a non-transitory computer readable storage medium) via a bus 120. The computer-readable storage medium 170 may include one or more modules 180-196 implemented in hardware, firmware, and/or software for facilitating content distribution through one or more distribution networks, such as email, SMS. MMS, social media networks, and/or other digital media communication approaches, including advertising spots.

In various embodiments, one or more of the illustrated modules 180-194 may be removed and/or implemented by a different system and/or in a different location. Some of the modules 180-194 may be implemented in software and others in hardware. Some of the modules 180-194 may be implemented and/or controlled by a first entity and others of the modules 180-194 may be implemented and/or controlled by one or more different entities. In some embodiments, some of the method steps and/or modules 180-194 described in connection with the V2 systems and methods may be omitted and/or modified without departing from the scope of this disclosure. One or more communications networks may facilitate communication between the various modules, databases of content, servers, and/or client devices useful for implementing the embodiments described herein.

As illustrated, a distributor identification module 180 may be configured to identify a content distributor. For example, the distributor identification module 180 may receive login credentials of a user and establish a session for the particular user. Identifying a particular content distributor may be useful in creating subsequent links that are associated with the particular user, identifying which library or libraries of content the particular content distributor should have access to, and other settings and configurations. A content distributor may log in to view, for example, a history of content distributions, statistics, reports, scheduled distributions, contact lists, and authorized and deauthorized distribution channels.

According to various embodiments, the distributor identification module 180 may identify a content distributor based on one or more of a username, a password, a login credential, an IP address, a MAC address, a biometric identification, and a network session identification. In some embodiments, a single V2 system may serve content distributors from multiple businesses. In such embodiments, the layout, icons, branding, content library, available features, and/or other aspects of the V2 system may be based on a determination of which of a plurality of business entities the identified content distributor is associated.

According to various embodiments, a content library module 182 may provide access to and/or store a library of content items. The content library module 182 may allow a content distributor to combine one or more content items to create a customized distributor content item. The content library module 182 may provide the content distributor access to the library of content items via a third-party website, third-party hyperlink, and/or a third-party database. The content library module 182 may include any number or variety of content items. Examples of content items include, but are not limited to, videos, images, articles, documents, audio files, hyperlinks to webpages, information request forms, QR codes, designs, layouts, templates, forms, and the like.

In some embodiments, a content selection and combination module 184 may allow for a systematic selection of readily combinable content items via the content library module 182. For example, the content selection and combination module 184 cooperates with the content library module 182 to allow for a selection of title content items. Once a title content item is selected by a content distributor, the available selection of image content items may be narrowed to include only those that have some relationship with the selected title content items.

Similarly, the selection of a text body content item may cause the V2 system to limit the available selection of image content items, title content items, video content items, web link content items, and/or other types of available content items to those that combine well or are otherwise related to the selected text body content item. In some embodiments, the selection of one or more specific distribution channels may cause the V2 system to limit the types of content available for selection. For example, the selection of an SMS distribution channel or an email distribution channel may modify or reduce the types of available content in the content library.

A resulting permutation and combination of content items from the library (or libraries) of content items may be referred to as a customized distributor content item. In various embodiments, a content distributor may elect to add personal content, such as a types message, a personal image, or other content items created by it or from a personal database of content items.

A bi-directional tracking link generation module 186 may facilitate the creation and incorporation of one or more bi-directional links into a customized distributor content item. These bi-directional links are interchangeably referred to as simply links and as V2 links throughout this disclosure. The bi-directional tracking link generation module 186 may create a unique link for at least each recipient. In some embodiments, a distributed customized distributor content item may include more than one unique link. In any event, if a unique link is selected, the V2 system 100 can identify both the distributor of the selected link as well as the recipient of the selected link.

In various embodiments, each link is associated with a particular customized distributor content item (i.e., the particular combination of content items and customizations thereof), distribution channel, distribution schedule, or other distribution characteristic. This association may facilitate reporting click-through rates and/or conversion rates at a granular level. In some embodiments, each content item within a particular customized distributor content item may be associated with a unique link as well. Thus, a unique, selectable, bi-directionally trackable link may be created for distribution with a customized distributor content item for each recipient.

As an example, if 15 unique content distributors each prepared a unique customized distributor content item for distribution to 10 recipients each (i.e., 150 unique recipients), then at least 150 unique V2 links would be distributed in conjunction with the distributed customized distributor content item. In some embodiments, a unique V2 link may be made for each distribution channel utilized to provide granular tracking of the relative success rates of each distribution channel. Accordingly, in the example above, if each of the 15 content distributors each scheduled the customized distributor content item for distribution via four distribution channels (e.g., Facebook, email, Twitter, and LinkedIn), then at least 600 unique V2 links would be created.

It is possible that some of the recipients of the 15 content distributors are the same. For example, one or more recipients may be considered a recipient of more than one of the content distributors. It may be that a recipient receives multiple, unique links to the same product sale location. The recipient may use only one of the received links to make a product purchase. Because each of the links is associated with a particular content distributor, the product purchase (conversion action) may be attributed to the correct content distributor.

Thus, it can be said that the V2 system 100 provides many-to-many link tracking. In contrast, some link tracking systems developed for conversion analytics and reporting may offer only one-to-many link tracking, in which there is only one sender or distributor or in which all the senders or distributors of the link have a common interest.

In various embodiments, a content distribution module 188 is configured to distribute the customized distributor content item via one or more distribution channels. Examples of distribution channels include, but are not limited to, email systems, social media networks, SMS messaging systems (including services similar to Apple's iMessage), MMS messaging systems, mobile application notifications, and digital advertisements. Examples of social media networks are innumerable and include, but are not limited to, Alm, CoComment, Delicious, Digg, Facebook, Flickr, Friendster, Google Plus, Google chat, iJigg, Kongregate, Last.fm, Twitter, Snapchat, etc.

The content distribution module 188 may allow a content distributor to schedule and/or stage the distribution of one or more customized distributor content items. Such scheduling may include adjustable distribution schedules based on date and time, recipient groupings, and distribution channel and/or in response to recipient actions, in response to recipient requests, and/or in response to a defined event (where an event is understood in the context of event-driven architectures (EDAs)).

The content distribution module 188 may facilitate the distribution of the V2 links in conjunction with the distribution of the customized distributor content items. For example, a customized distributor content item created by a content distributor may comprise a Facebook post that includes a title caption content item, a body of text content item, and a hyperlink to an external video content item. The hyperlink to the external video may be a standard URL. The bi-directional tracking link generation module 186 and/or the content distribution module 188 may convert the standard URL to a plurality of unique V2 links for each recipient, and possibly for each recipient via each type of distribution channel. Each of these V2 links may comprise a shortened URL with bi-directional tracking capabilities as described herein.

As another example, a customized distributor content item may be a 144-character tweet for distribution through Twitter. In such an embodiment, the customized distributor content item may include an image content item, a relatively short text content item, and a URL hyperlink content item that directs a recipient to a web page where a related product may be purchased. The content distribution module 188 may convert the image to a plurality of V2 links that redirect to an online version of the image and/or a plurality of V2 links for the URL hyperlink to the web page.

In various embodiments, a tracking module 190 may facilitate tracking of the V2 links. The tracking may include click-through tracking, conversion action tracking, time delays between clicks and conversions, recipient tracking, content distributor tracking, and/or other combinations of information associated with a V2 link as described herein. As unique V2 links are created for each recipient, even if a large number of content distributors are using the same V2 system, each conversion action by any recipient, even if the same recipient has received content from multiple content distributors, can be tracked and attributed to the correct content distributor. Tracking module 190 and multi-distributor attribution module 192 may facilitate the tracking and attributions described herein.

A reporting module 194 may generate and provide a report that includes various relationships and/or comparisons between one or more content distributors, recipients, the number of recipients that received one or more customized distributor content items, the number of recipients that selected a unique link, and the number of recipients that performed a conversion action after selecting a unique link.

According to various embodiments, a content delivery approach template module 196 may allow one content provider (e.g., a leader, supervisor, manager, more experienced content provider, coach, trainer, team captain, etc.) to create a content delivery approach. A content delivery approach may include variations in one or more of the content items or combinations of content items that are distributed, the distribution schedule, the recipients, the distribution channel(s), and/or permutations or combinations thereof.

For example, a sales leader may decide to create a content delivery approach for use by everyone in the sales leader's team or everyone under the sales leader's purview. The sales leader may define one or more customized distributor content items that comprise one or more content items from a library of content items and/or personal content items or customizations. The sales leader may optionally define or recommend the distribution channels to be used. The sales leader may optionally define or recommend a distribution schedule as well. The distribution schedule may be as simple as a future date for the distribution of all of the one or more customized distributor content items via all of the one or more distribution channels. In more complex embodiments, the distribution schedule may include specific time schedules for staging the distribution of multiple customized distributor content items over various distribution channels at various times and dates or in sequences. The sales leader's content delivery approach may define a single customized distributor content item for distribution, or may define a complex schedule of various customized distributor content items over a period of time via a defined set of distribution channels.

As in other embodiments, unique V2 links may be created for each individual recipient, for each distribution channel, for each content item or combination of content items, for each content distributor, and/or for each defined content delivery approach. In some embodiments, conversion actions and/or other tracked events, such as click-throughs, may be attributed to the content provider that distributed the V2 link and also or partially attributed to the creator of the defined content delivery approach. In various embodiments, this may allow the creator of the defined content delivery approach to receive attribution for a conversion action without being made aware of who the actual recipient is.

As used herein, the phrases "personal digital networking," "personal online networking," variations thereof, and similar phrases relate to any form of digital communication of electronic content between senders and receivers in a broad sense. For example, such digital communications include, but are not limited to, social media, email, SMS, MMS, chat services, forum postings, messaging services, video sharing sites, news feeds, and/or other electronic word of mouth communications.

Figure 2:
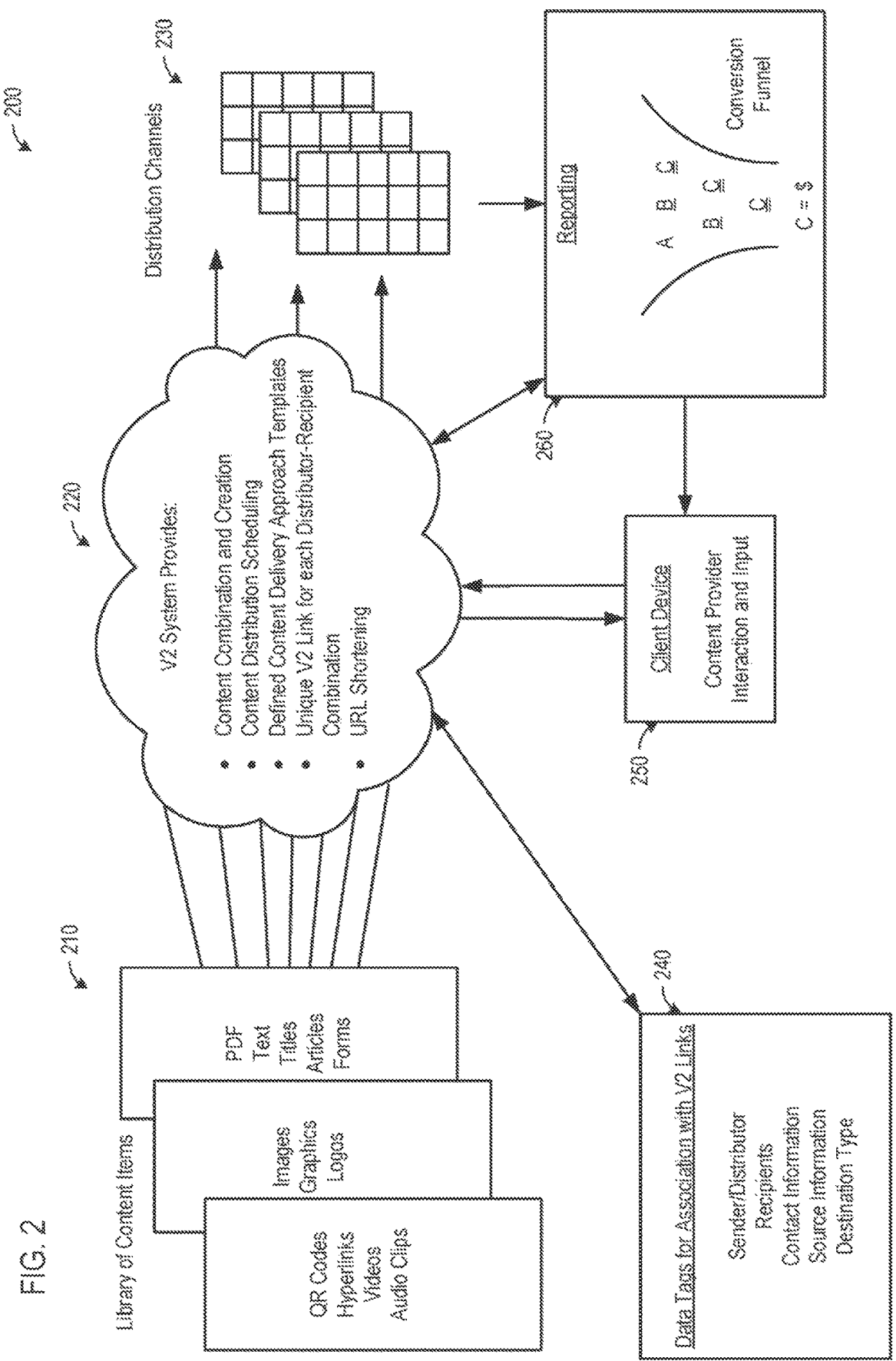
FIG. 2 is a block diagram of various system components for enhancing personal online networking with bi-directional tracking and multi-user attribution for conversion actions, according to one embodiment.

FIG. 2 is a block diagram 200 of one embodiment of some of the components and interactions with a V2 system 220 for enhancing personal digital networking via digital communications with bi-directional tracking and multi-user attribution for conversion actions. As illustrated, a V2 system 220 may present a useable interface, such as a graphical user interface (GUI) to a content provider, via a client device 250. The GUI may allow the content provider, via the client device 250, to select content from a library of content 210, as described herein. The V2 system 220 may facilitate, through for example a GUI, the creation and/or combination of content to be distributed via one or more distribution channels 230. The V2 system 220 may allow for complex or simple scheduling of the distribution of content. The V2 system 220 may allow for the creation of a defined content delivery approach, as described herein.

The V2 system 220 may associate various data tags 240 with each of a plurality of V2 links for each of the plurality of recipients for each of a plurality of content providers. The V2 system 220 may provide reporting 260 on click-throughs, conversion rates, and/or other recipient-initiated events. The reporting may be very granular and detailed as the V2 links may have any number of associated data tags 240 and may be specific to recipients, content distributed, distribution channels utilized, content providers, schedules utilized, and other information.

In some embodiments, a conversion funnel modelling may be used to identify combinations of content, scheduling, and distribution channels that are more or most successful. In various embodiments, the content provider, via the client device 250, may revise and/or prepare subsequent content distribution events based on the reporting analytics and/or recommendations.

Figure 3:
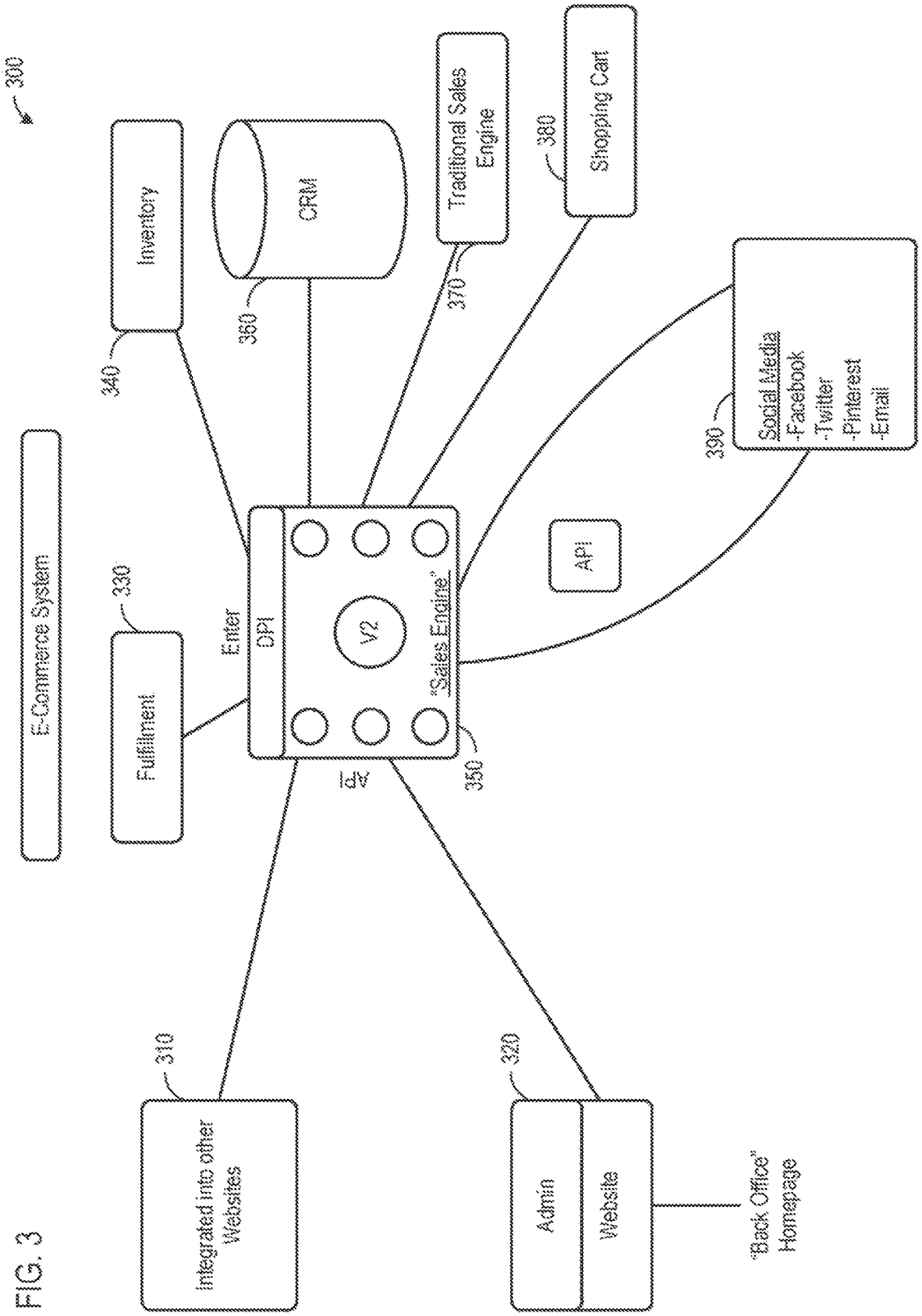
FIG. 3 is a block diagram depicting the interrelation of various system components for enhancing personal digital networking with bi-directional tracking and multi-user attribution for conversion actions, according to another embodiment.

FIG. 3 is a block diagram illustrating the V2 system 350 as a central hub in various part of a complete e-commerce system. The V2 system 350 represents any combination of the embodiments and features of the various V2 systems and methods described herein. As illustrated, the V2 system 350 may be integrated into the existing websites 310 of one or more clients, each of which clients may have a plurality of content distributors (e.g., salespersons, product distributors, realtors, brokers, etc.). A back office or baseline website 320 may be accessible to some clients and/or administrators. The V2 system 350 may be the driving sales engine for the clients described in the existing websites 310 and so may be integrally connected with each client's product or service fulfillment center 330.

Similarly, inventory, availability, and pricing 340 may be integrally connected through the V2 system 350. Customer relationship management (CRM) tools may be integrally connected with the V2 system 350. Actions performed by content recipients with respect to the V2 links described herein may be used to update the CRM database. The customer and prospect contact information, accounts, leads, and sales opportunities within the CRM database may be used to determine which recipients receive what content and when through the V2 system 350.

Furthermore, traditional sales engines and sales websites 370 (i.e., those sales not associated with a specific content distributor) may be facilitated through the V2 system 350. The V2 system may provide and/or be integrated with an online shopping cart or a simplified version of a shopping cart 380. As described in greater detail above, the V2 system allows for V2 links to be created and distributed in conjunction with manually created content or content made via the combination of various content items from a library.

As described in greater detail above, the V2 links provide bi-directional tracking and can be associated at a granular level with each content distribution, distribution channel, recipient, and/or content distributor. The V2 system 350 may distribute content and associated V2 links to a plurality of recipients via one or more distribution channels, including social media distribution channels 390 such as Facebook, Twitter, Pinterest, email, SMS, etc.

Figure 4:
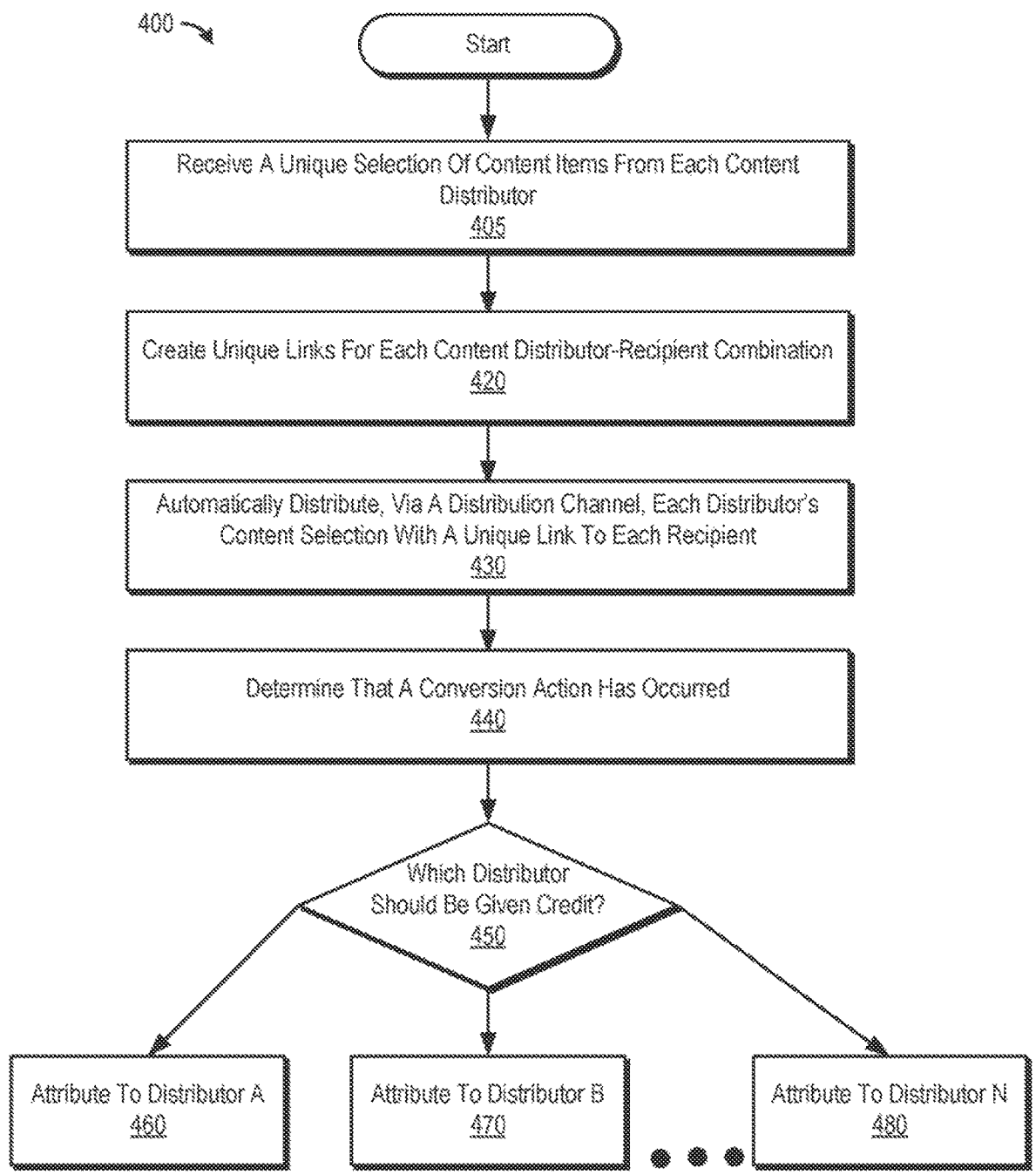
FIG. 4 is a flow chart of a method for enhancing personal digital networking with bi-directional tracking and multi-user attribution for conversion actions, according to one embodiment.

FIG. 4 is a flow chart of a method 400 for enhancing personal digital networking with bi-directional tracking and multi-user attribution for conversion actions, according to one embodiment. As illustrated, a system may receive a unique selection of content items from each of a plurality of content distributors, at 405. The system may create unique links (referred to herein interchangeably as V2 links) for each content distributor-recipient combination, at 420. The system may then distribute, via at least one distribution channel, each distributor's content selection with a unique link to each recipient, at 430. The system may then determine that a conversion action has occurred, at 440. The system may use the unique bi-directional tracking of the V2 link to determine not only which recipient performed the conversion action, but also which distributor merits credit for the conversion action, at 450. The conversion action may be a product or service sale, or it may simply be the selection of the link. Finally, the conversion action is attributed to the correct distributor A-N, at 460-480.

Figure 5:
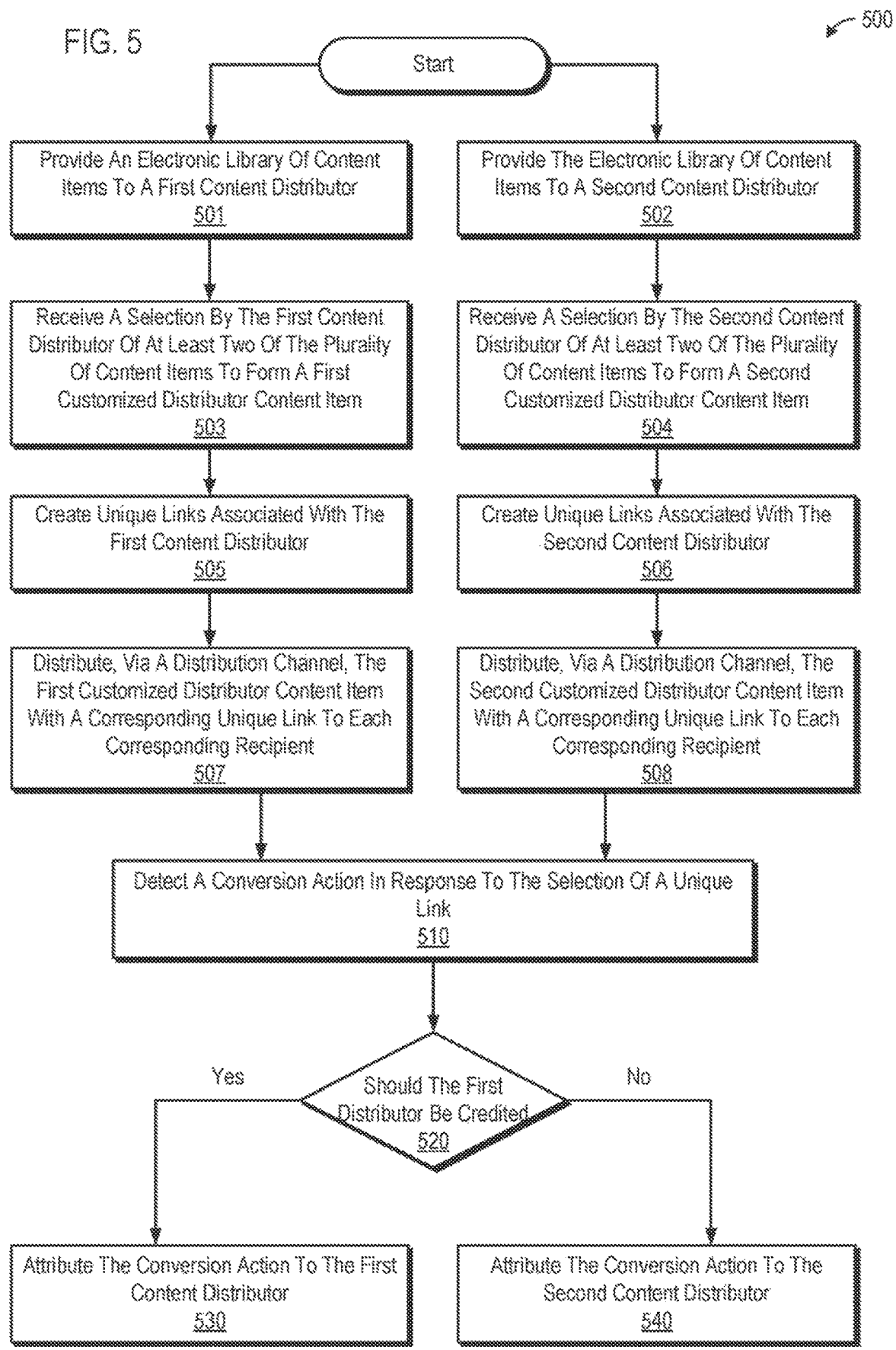
FIG. 5 is another flow chart of a method for enhancing personal digital networking with bi-directional tracking and multi-user attribution for conversion actions, according to another embodiment.

FIG. 5 is another flow chart of a method 500 for enhancing personal digital networking with bi-directional tracking and multi-user attribution for conversion actions, according to another embodiment. As illustrated, a first content distributor is provided with access to an electronic library of content items, at 501. Contemporaneously, though not necessarily simultaneously, a second content distributor is provided with access to the same electronic library of content items, at 502. Each of the two content distributors makes a selection of one or more content items, at 503 and 504, to form a customized distributor content item. The two customized distributor content items may be different from each other.

The V2 system may create a first plurality of V2 links that are associated with the first content distributor and each of the intended recipients of the first content distributor, at 505. The V2 system may create a second plurality of V2 links that are associated with the second content distributor and each of the intended recipients of the second content distributor, at 506. In some embodiments, some of the recipients may be intended recipients of both the first and second content distributors. One of the recipients may perform a conversion action in response to the selection of one of the V2 links, at 510. The unique V2 links associated with both the content providers and the recipients allow the V2 system to decide, at 520, which of the two content distributors should be attributed with the conversion action, at 530 and 540.

Figure 6:
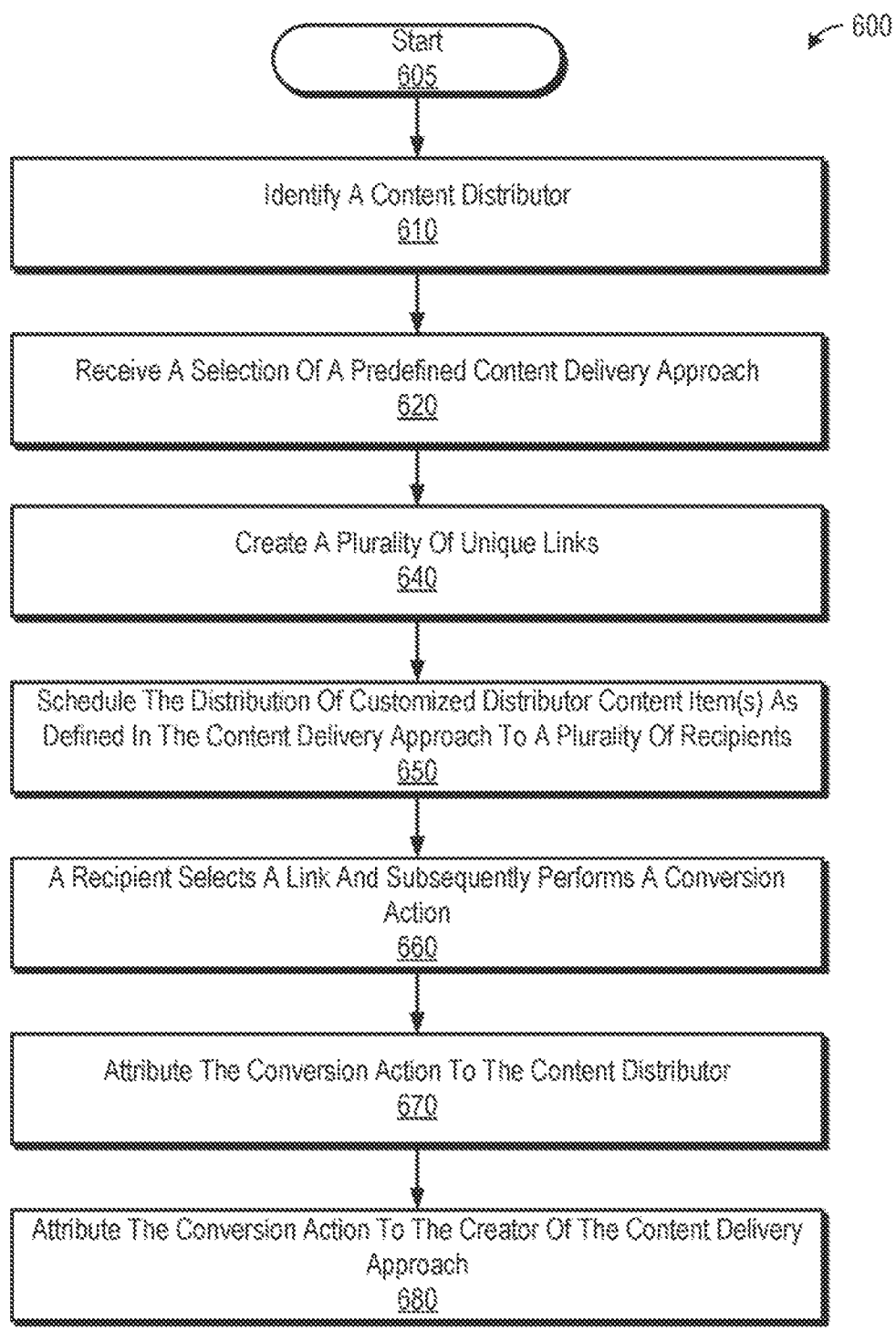
FIG. 6 is a third flow chart of a method for enhancing personal digital networking with bi-directional tracking and multi-user attribution for conversion actions, according to a third embodiment.

FIG. 6 is a third flow chart of a method 600 for enhancing personal digital networking with bi-directional tracking and multi-user attribution for conversion actions, according to a third embodiment that includes a predefined content delivery approach. As illustrated, a content distributor is identified, at 610. The content distributor makes a selection of a predefined content delivery approach, at 620. The predefined content delivery approach may include variations in one or more of the content distributed, the distribution schedule, the recipients, the distribution channel(s), and/or permutations thereof.

As described herein, a plurality of V2 links are created that are associated with the content distributor and each of a plurality of recipients, optionally the creator of the content delivery approach, optionally the content delivery approach itself, and optionally the content to be distributed. The recipients may be, for example, the contacts of the content distributor in each of a wide variety of social media platforms. For example, the content distributor may have a plurality of Facebook friends, a different plurality of Twitter followers, a different plurality of LinkedIn connections, a different plurality of email addresses, and so forth. Thus, the "recipients" for each distribution channel of a particular content distributor may be different.

As described previously, some distribution channels may allow content to be distributed to a broad spectrum of unique recipients. For example, Facebook allows a content distributor to post content on a "wall" that is visible to anyone or an authorized subset of recipients. However, the content distributor may not know which specific recipients have accessed or otherwise viewed the distributed content. In these situations, the V2 system may not create distinct V2 links for each recipient, as the number of recipients and their identities may be unknown or it may not be possible to display a different V2 link to each viewer (recipient) of the post.

Thus, since distribution channels may allow for broad spectrum posting and/or discrete communications to specific recipients, the number of V2 links created for each discrete recipient and/or each group of identified or even unidentified recipients may depend on the features set of the selected distribution channel or distribution channels.

Content distributors and/or the V2 system may use such distribution channels for broad spectrum posting and/or discrete communications to specific recipients. In both cases, the V2 system may create a plurality of electronically selectable unique links that are each associated with (1) a corresponding content distributor, (2) a corresponding unique content selection made by the corresponding content distributor, and (3) a corresponding recipient or recipients as the case may be depending on whether the distribution channel allows for discrete distribution to individual recipients or only broad distribution to an identified or even unidentified group of recipients.

Returning to FIG. 6, the V2 system as described herein may facilitate the distribution of the content items as defined in the content delivery approach, at 650. In some embodiments, the content delivery approach may define only the content item(s) to be distributed and not define a distribution schedule or distribution channels to be used. In such embodiments, the content provider in 610 may provide these instead.

A recipient may select a link and thereby or subsequently perform a conversion action, at 660. The conversion action may be attributed (optionally partially) to the content distributor, at 670, and/or (optionally partially) to the creator of the content delivery approach, at 680.

Figure 7:
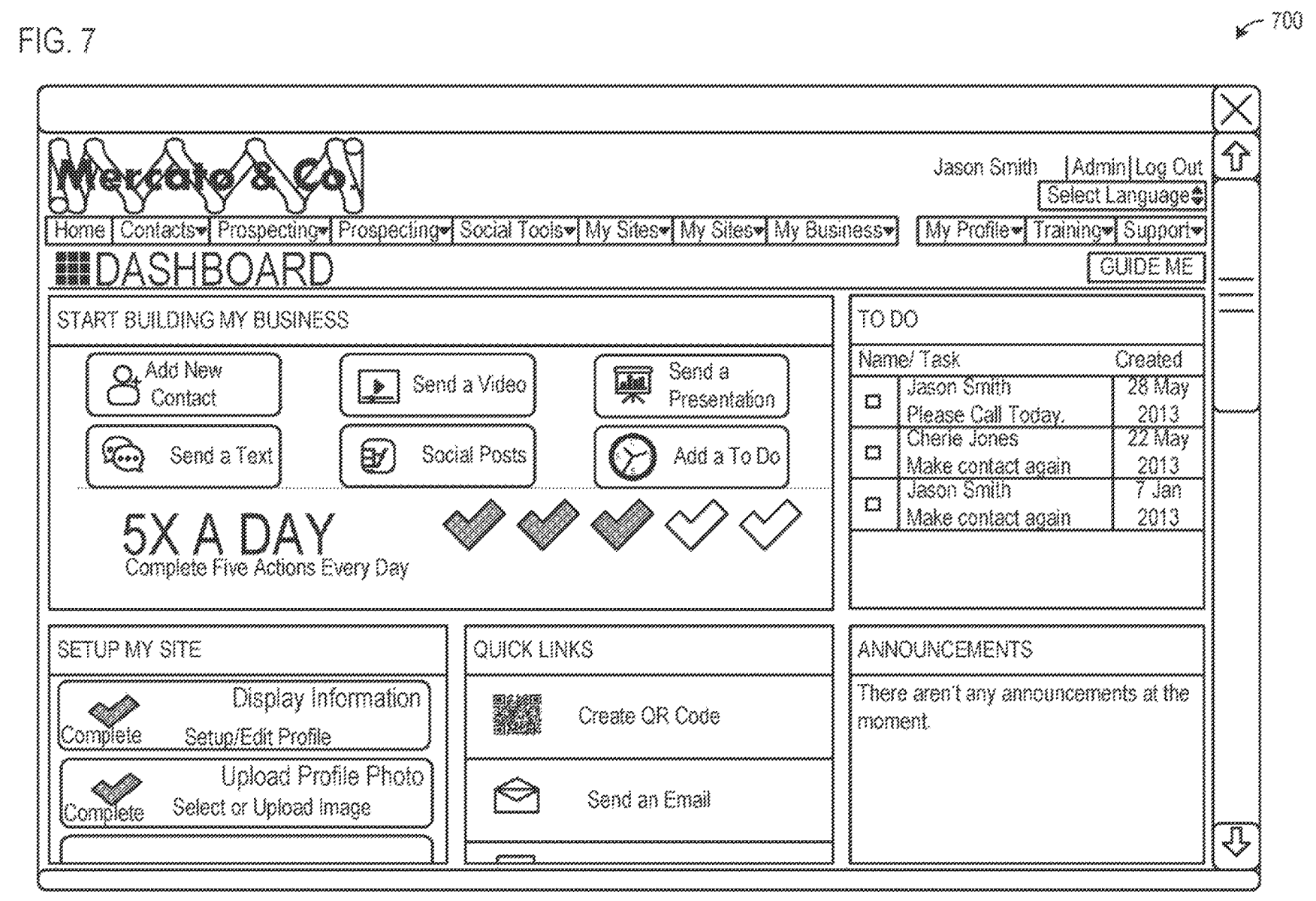
Figure 8:
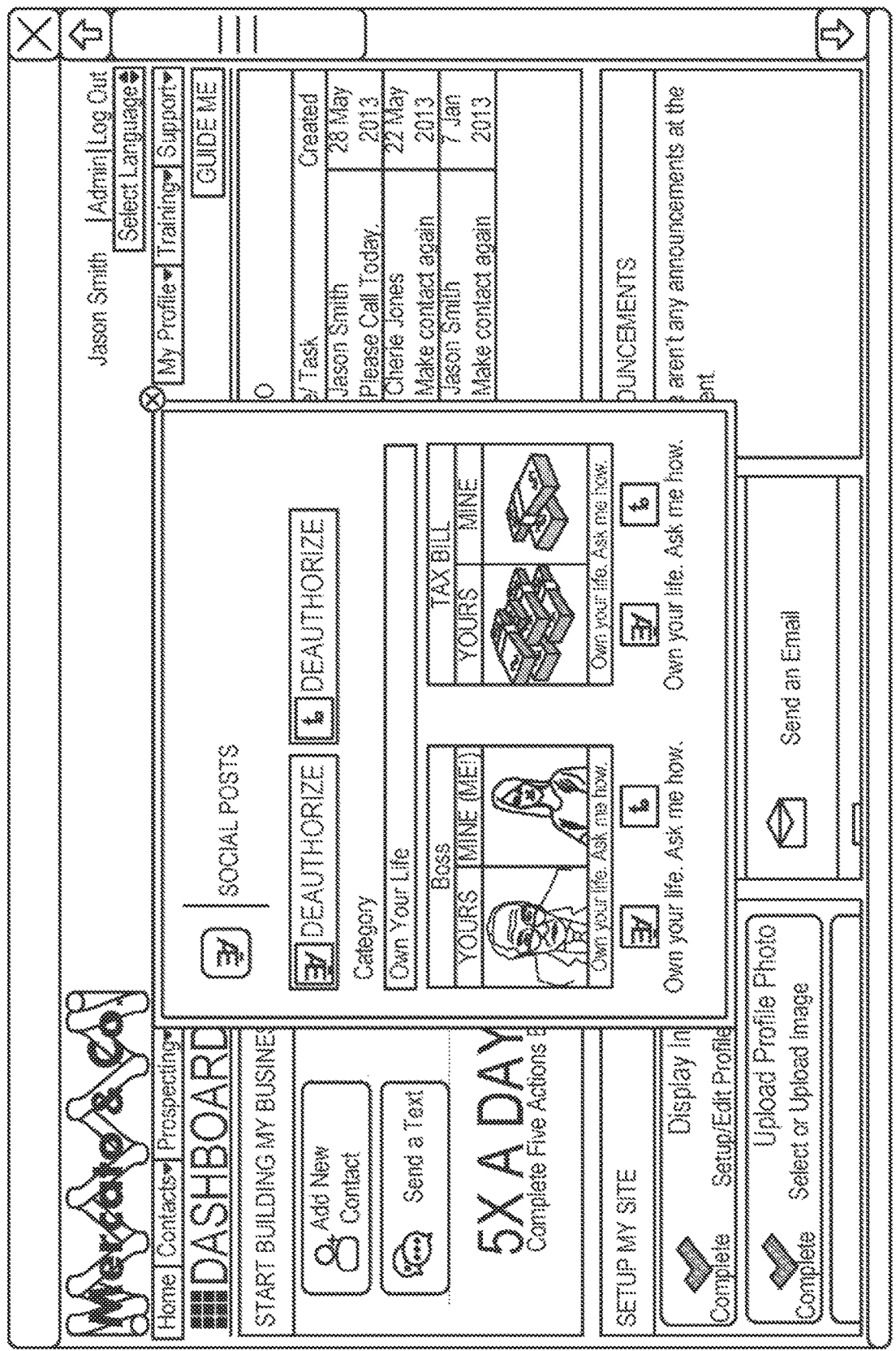
FIG. 8 illustrates one embodiment of a GUI of a dashboard widget for authorizing and deauthorizing social media distribution channels for a manual post.

FIG. 7 illustrates one embodiment of a GUI of a home page dashboard 700 for initiating content creation, combination, and ultimately distribution through one or more distribution channels. The illustrated GUI facilitates the creation and distribution of links with bi-directional tracking capabilities that allow for multi-user attribution of subsequent conversion actions. Navigation to other features, such as reporting, may be facilitated via the dashboard 700, FIG. 8 illustrates one embodiment of a GUI 800 of a dashboard widget for authorizing and deauthorizing social media distribution channels for manual or scheduled post.

Figure 9:
FIG. 9 illustrates one embodiment of a GUI for selecting content from a library of content for distribution via one or more distribution channels according to a defined distribution schedule.

FIG. 9 illustrates one embodiment of a GUI 900 for selecting content from a library of content for distribution via one or more distribution channels according to a defined distribution schedule. As illustrated, various settings for distributing content may be selected and various content combinations may be created. Moreover, various languages may be utilized. In some embodiments, each recipient within the contact list of a content distributor may be tagged with a language tag. The content distributor may then select a content item or combinations of content items and mass distribute it to all or a subset of the recipients within the contact list. The V2 system may distribute the content item(s) in the language indicated in each recipient's language tag, if corresponding content is available for the tagged language.

FIG. 10 illustrates one embodiment of a GUI 1000 for selecting content from a library of content for distribution via one or more distribution channels according to a defined distribution schedule.

Figure 11:
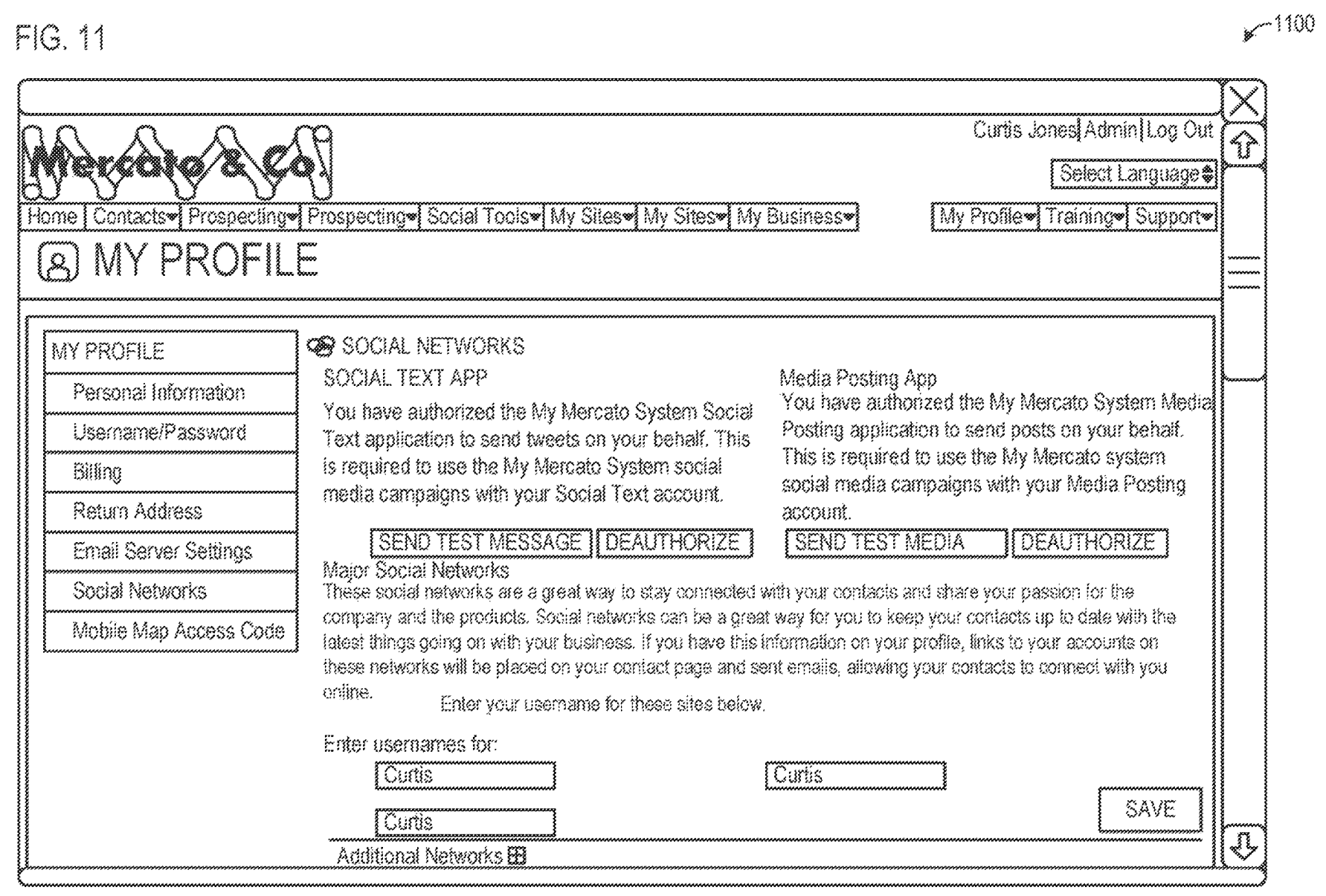

FIG. 11 illustrates one embodiment of a GUI 1100 for editing content distributor profiles and for authorizing and enabling one or more distribution channels, including social media, SMS, and email distribution channels.

FIG. 12 illustrates one embodiment of a GUI 1200 for creating manual posts with one or more content items from a library of content for distribution via one or more distribution channels.

Figure 13:
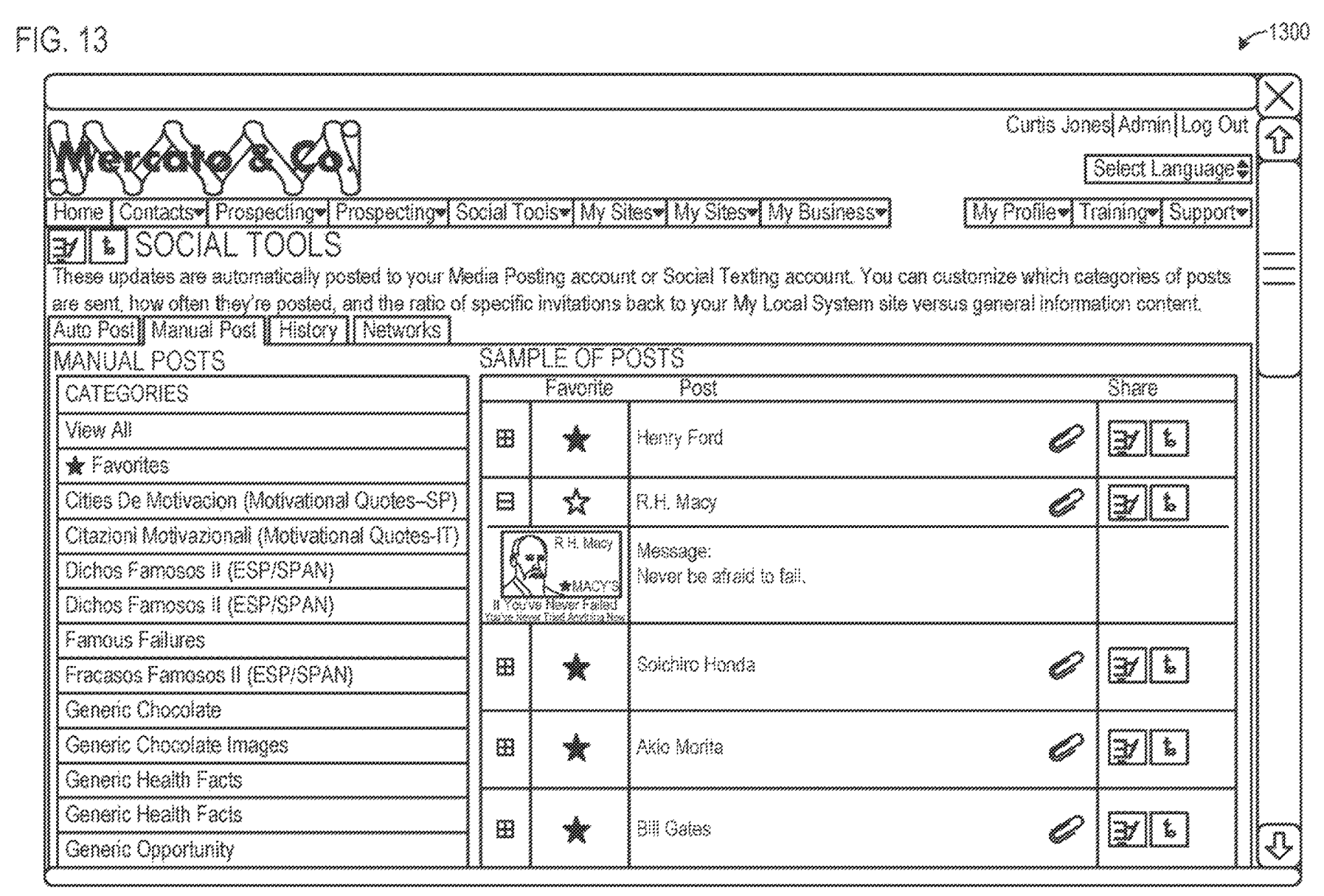

FIG. 13 illustrates one embodiment of a GUI 1300 for navigating through the content items within the library of content items for distribution via the one or more distribution channels (shown under the "share" column as icons).

Figure 14:
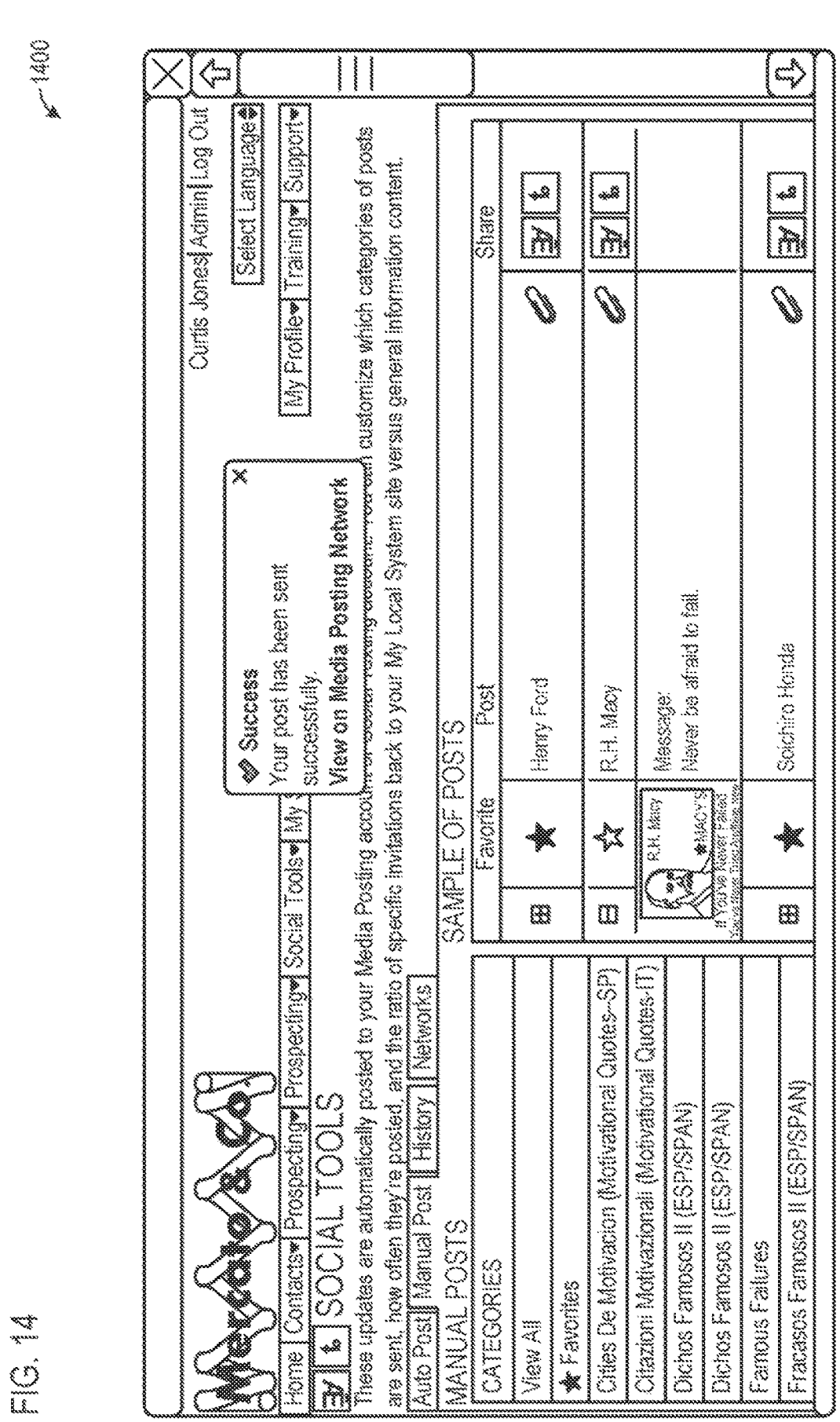
FIG. 14 illustrates one embodiment of a GUI showing that a customized distributor content item has been distributed along with a shortened link configured to facilitate bi-directional tracking and multi-user attribution.

FIG. 14 illustrates one embodiment of a GUI 1400 showing that a customized distributor content item has been distributed along with a shortened V2 link configured to facilitate bi-directional tracking and multi-user attribution.

Figure 15:
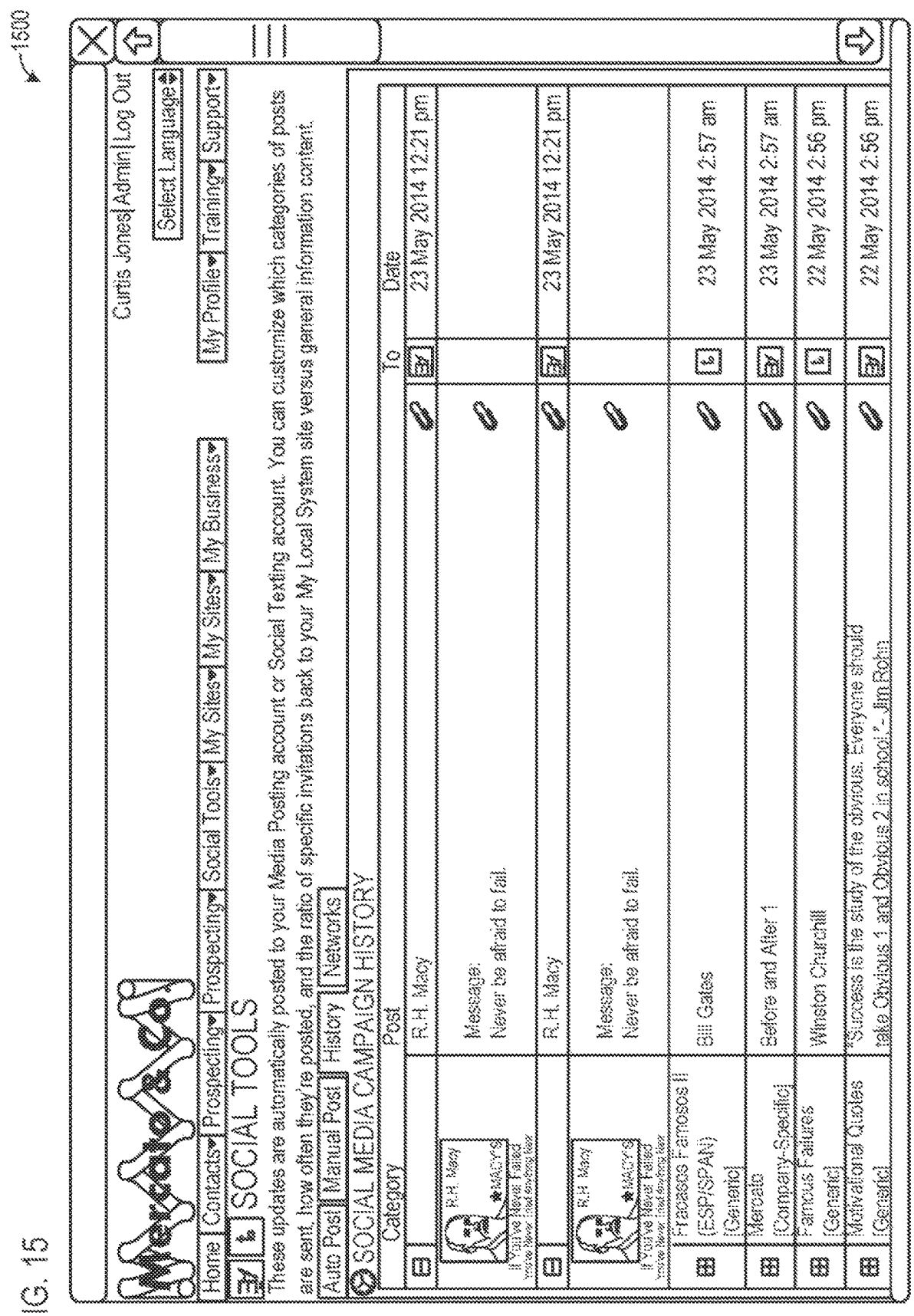
FIG. 15 illustrates one embodiment of a GUI for viewing a distribution history.

FIG. 15 illustrates one embodiment of a GUI 1500 for viewing a distribution history. The history may include a record of the content shared, the recipients, the distribution channels used, and the dates. In some embodiments, the V2 system may provide warning or notices if a content distributor attempts to distribute a particular content item or combination of content items that was previously distributed to the same recipient(s) within a certain timeframe.

Figure 16:
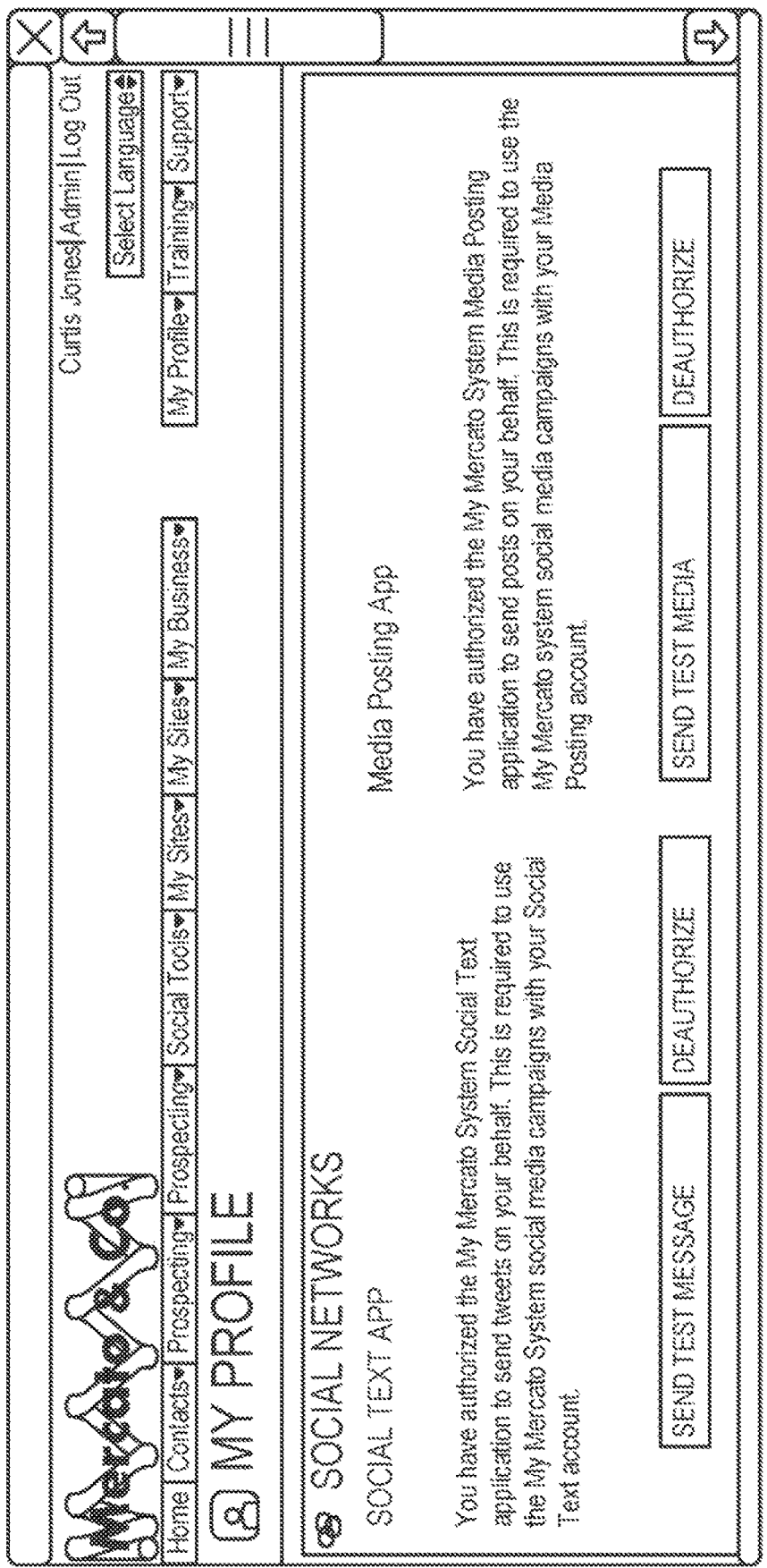
FIG. 16 illustrates one embodiment of a GUI for authorizing and enabling one or more distribution channels, including social media, SMS, and email distribution channels.

FIG. 16 illustrates one embodiment of a GUI 1600 for authorizing and enabling one or more distribution channels, including social media, SMS, and email distribution channels.

Figure 17:
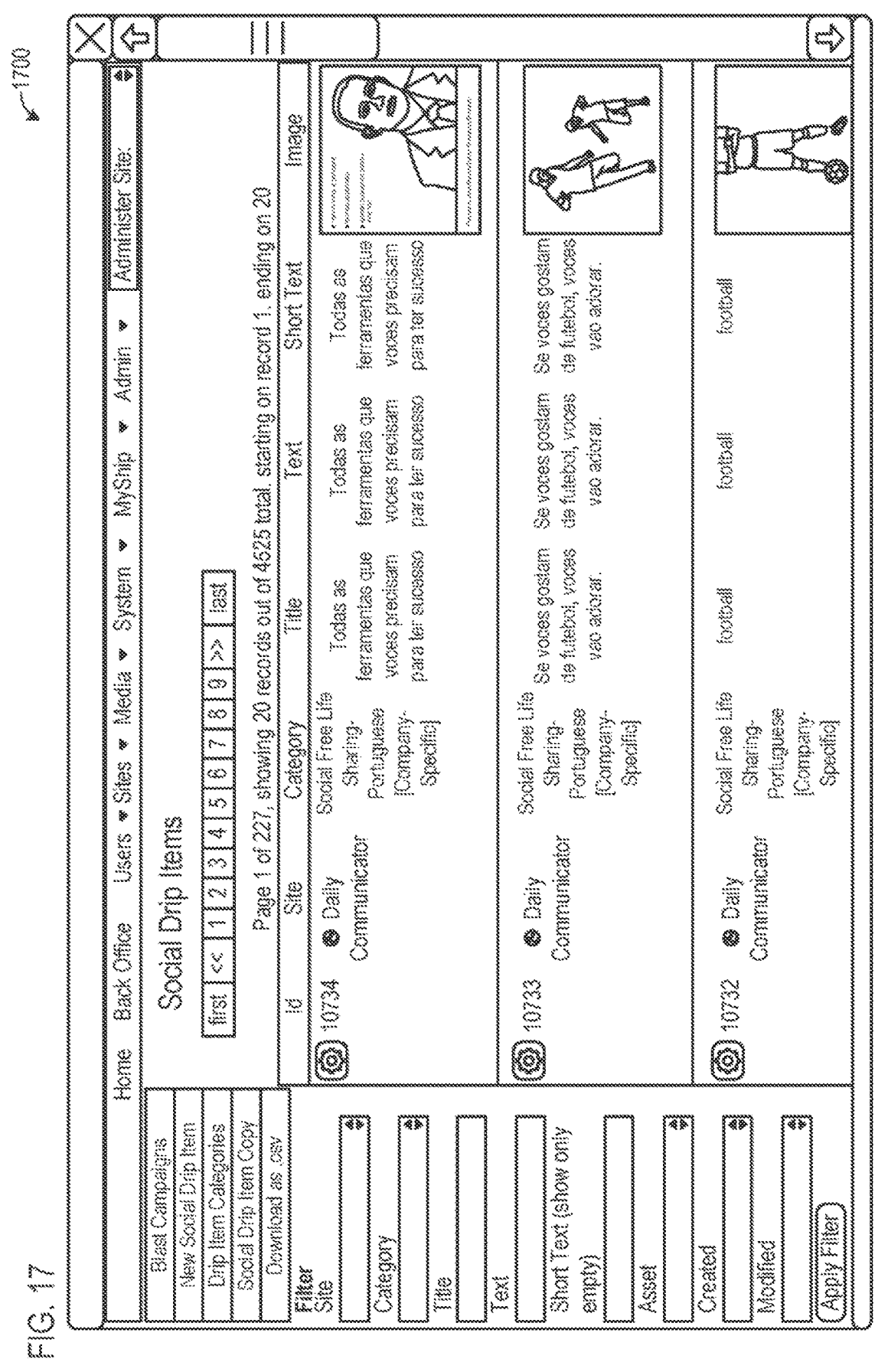

FIG. 17 illustrates one embodiment of a GUI 1700 for allowing a distributor to create customized distributor content items, illustrated as social drip items, using one or more content items from a library of content items. As illustrated, the library of content and distribution schedules may include various blast campaigns, social drip items, social drip categories, and other options. A social blast campaign may comprise the distribution of one or more content items and V2 links to one or more recipients according to a distribution schedule. The distribution schedule may be complex or as simple as "distribute now." As illustrated, the V2 system may be multi-lingual and allow for cross-border distributions.

Figure 18:
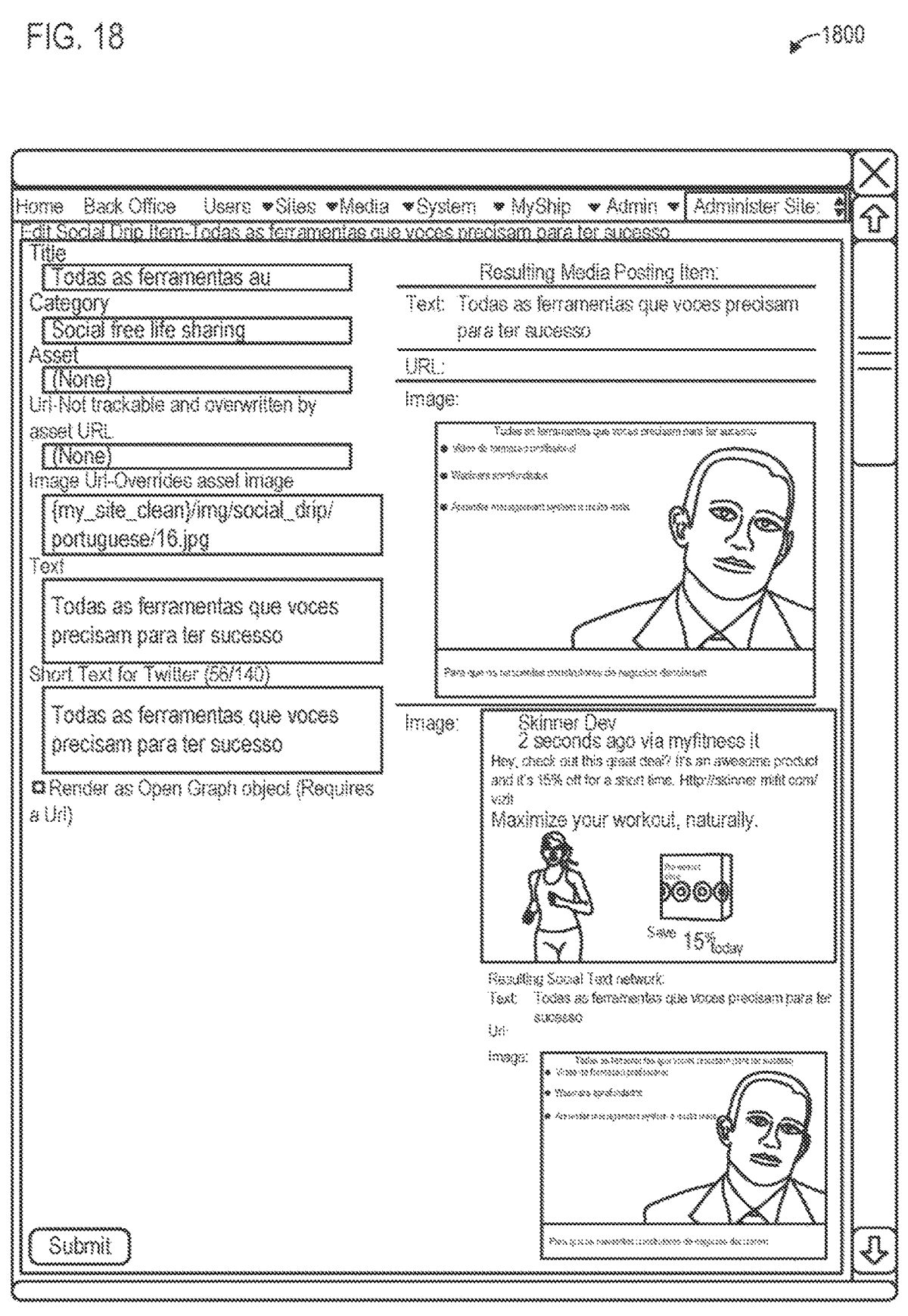

FIG. 18 illustrates one embodiment of a GUI 1800 for viewing and editing a customized distributor content item that is made up of multiple content items from a library of content items. As illustrated, the customized distributor content item may simply be a combination of library content items and/or may include personalized content provided by the content distributor.

FIG. 19 illustrates one embodiment of a GUI 1900 for reporting and reviewing the effectiveness of social blast campaigns where content items and traceable links have been shared by one or more content distributors with a large number of recipients via one or more distribution channels.

Figure 20:
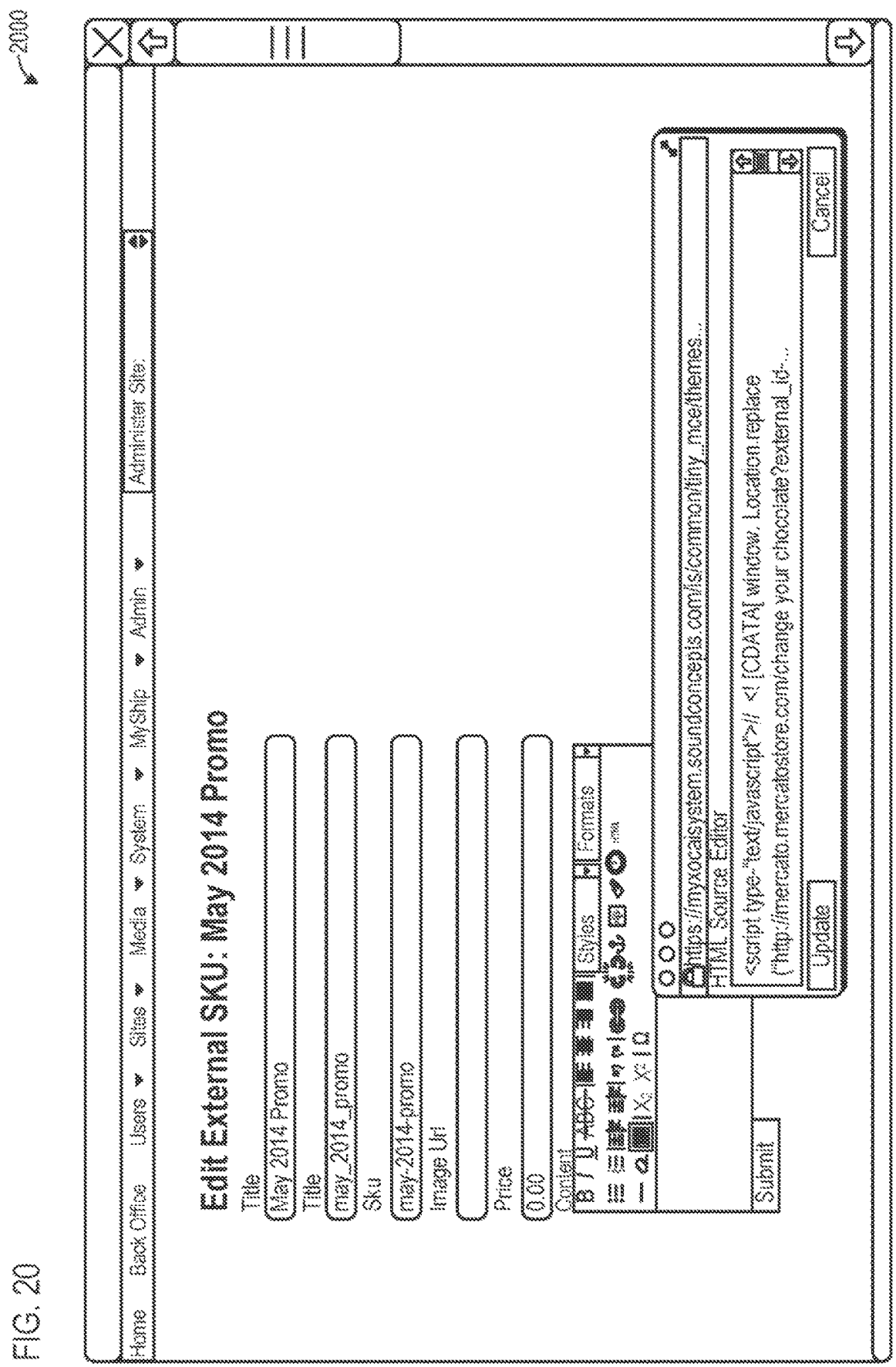
FIG. 20 illustrates one embodiment of a GUI for linking external content using bi-directionally traceable links for conversion attribution to the correct content distributor.

FIG. 20 illustrates one embodiment of a GUI 2000 for linking external content using bi-directionally traceable/trackable links for conversion attribution to the correct content distributor.

Figure 21:
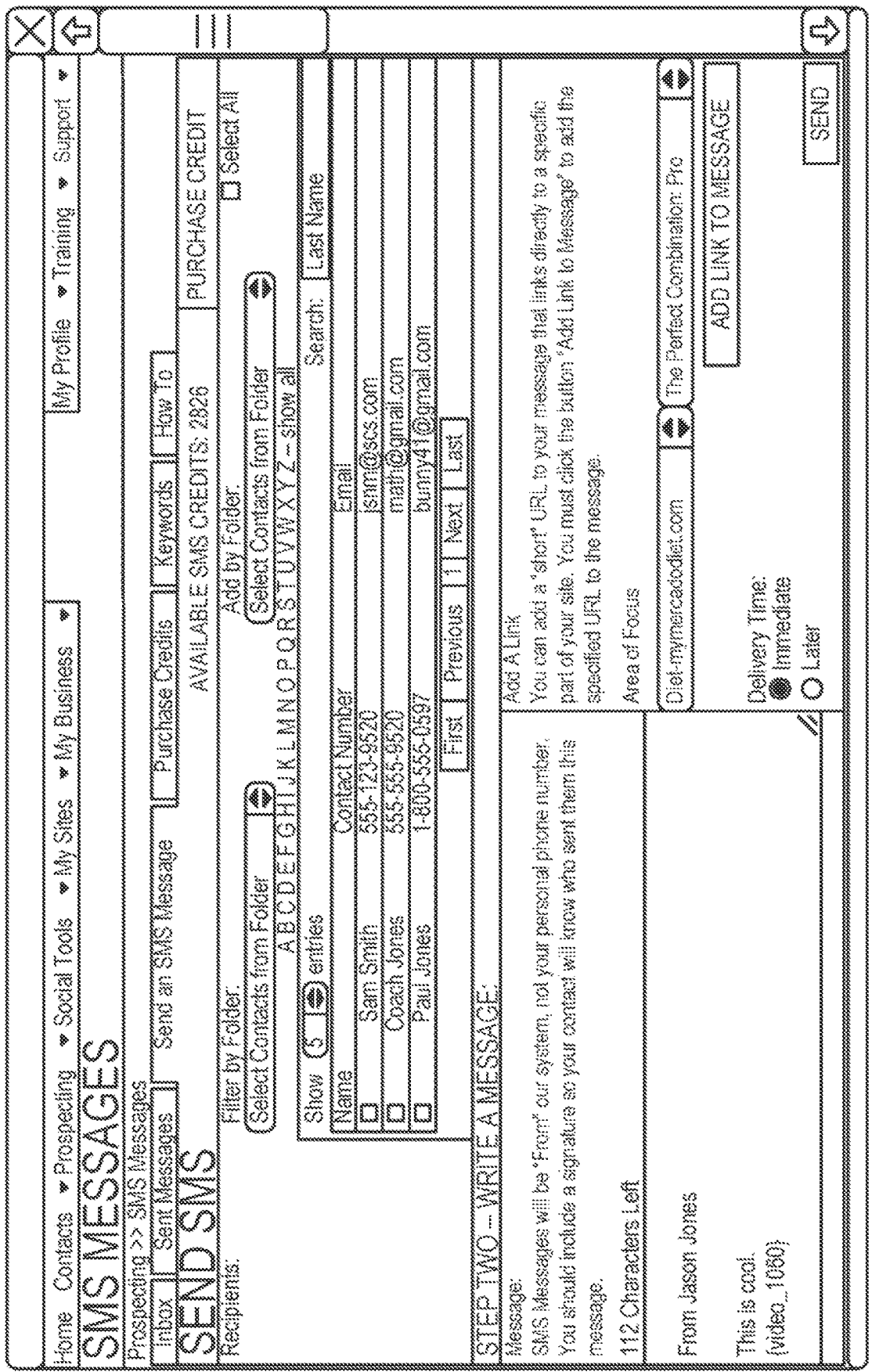
FIG. 21 illustrates one embodiment of a GUI for creating bi-directionally traceable links for various content types for distribution via an SMS distribution channel.

FIG. 21 illustrates one embodiment of a GUI 2100 for creating bi-directionally traceable links for various content types for distribution via an SMS distribution channel. As illustrated, a content distributor may identify recipients, write a message, add links, select content from drop-down menus, schedule a delivery time, etc. As in previous embodiments, the content items may be distributed via a V2 link and/or in combination with a V2 link to provide bi-directional tracking and proper attribution for conversion actions resulting from the SMS blast campaign.

Figure 22:
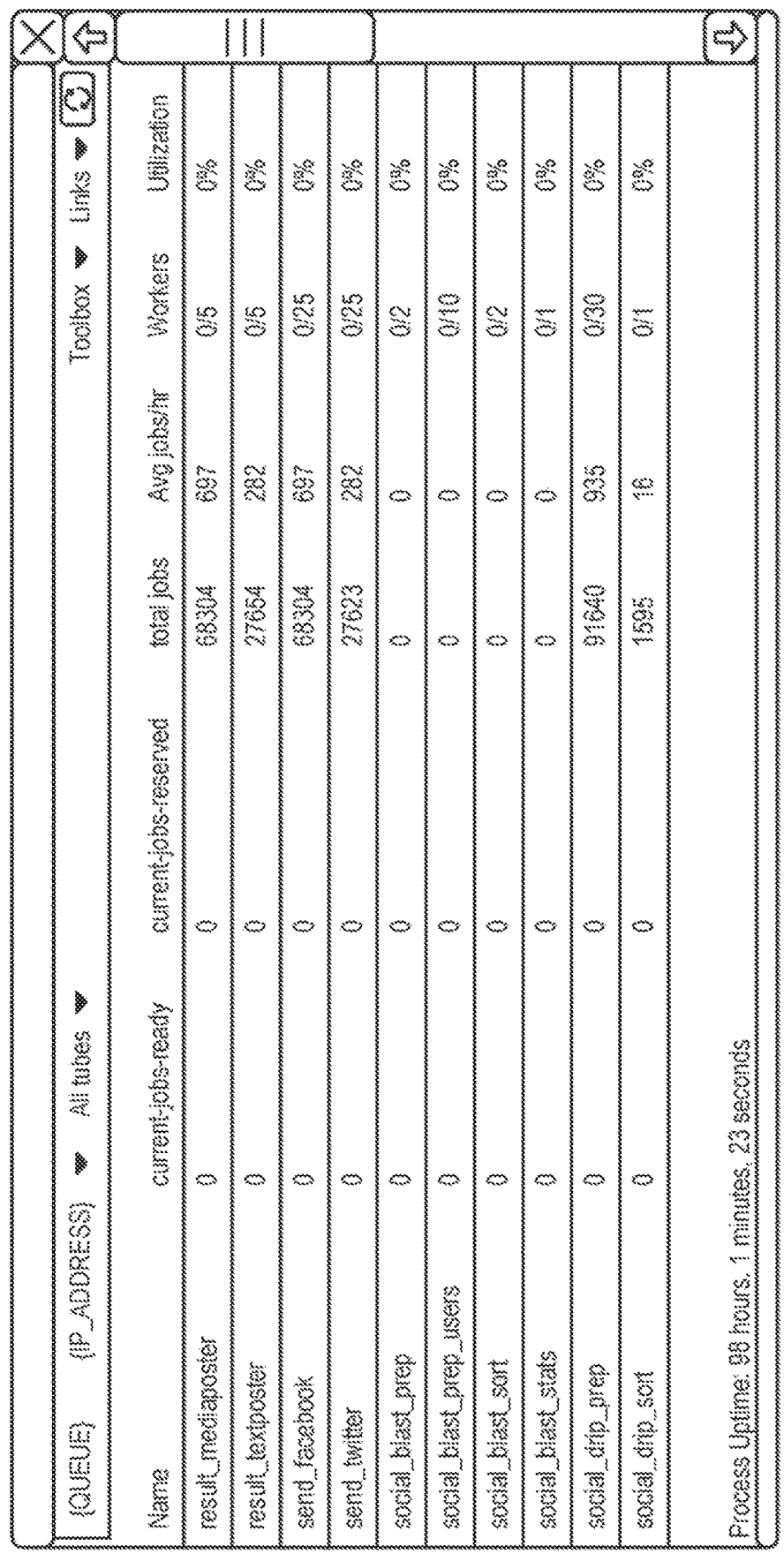
FIG. 22 illustrates one embodiment of a GUI for viewing and/or editing the queued distribution of customized distributor content items via a variety of distribution channels.

FIG. 22 illustrates one embodiment of a GUI 2200 for viewing and/or editing the queued distribution of customized distributor content items via a variety of distribution channels.

Figure 23:
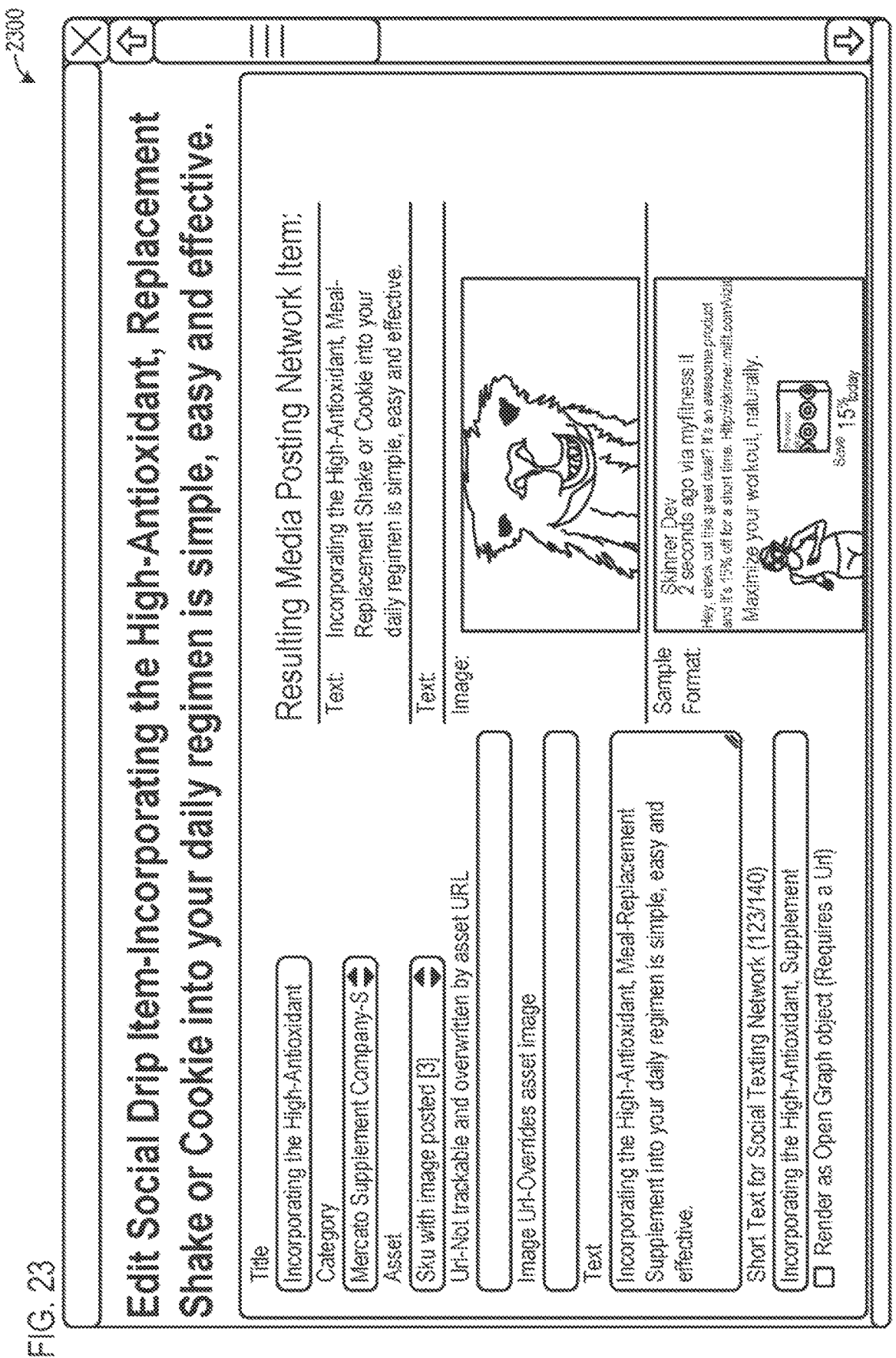
FIG. 23 illustrates one embodiment of a GUI for viewing and editing a customized distributor content item based on original distributor content and content items from the library of content items.

FIG. 23 illustrates one embodiment of a GUI 2300 for viewing and editing a customized distributor content item based on original distributor content and content items selected from the library of content items. As illustrated, short and long descriptions may be provided and the V2 system may select which will be used for a particular distribution channel.

Figure 24:
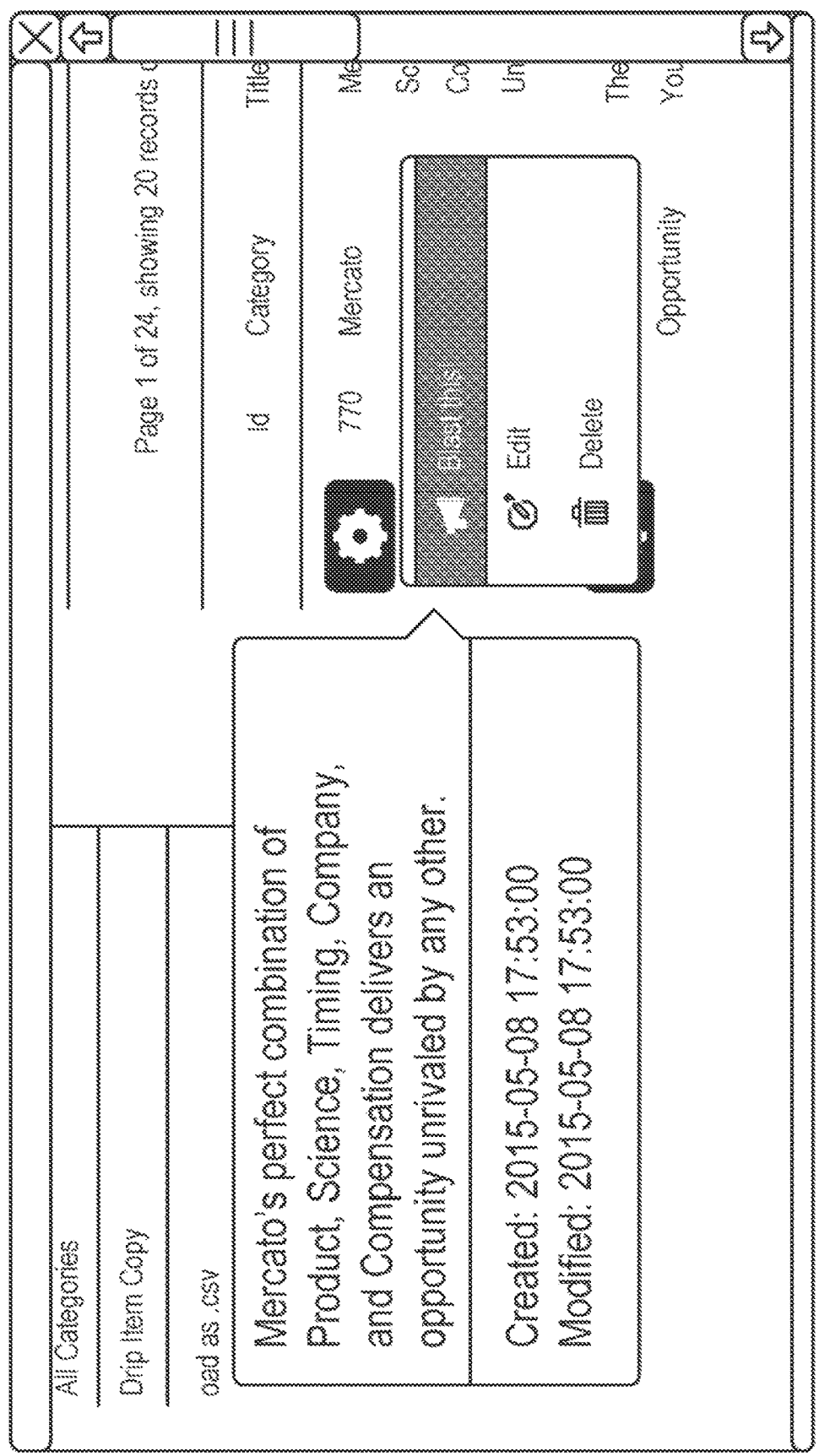
FIG. 24 illustrates one embodiment of a GUI for blasting a particular content item or combination of content items via one or more distribution channels.

FIG. 24 illustrates one embodiment of a GUI 2400 for blasting a particular content item or combination of content items via one or more distribution channels.

Figure 25:
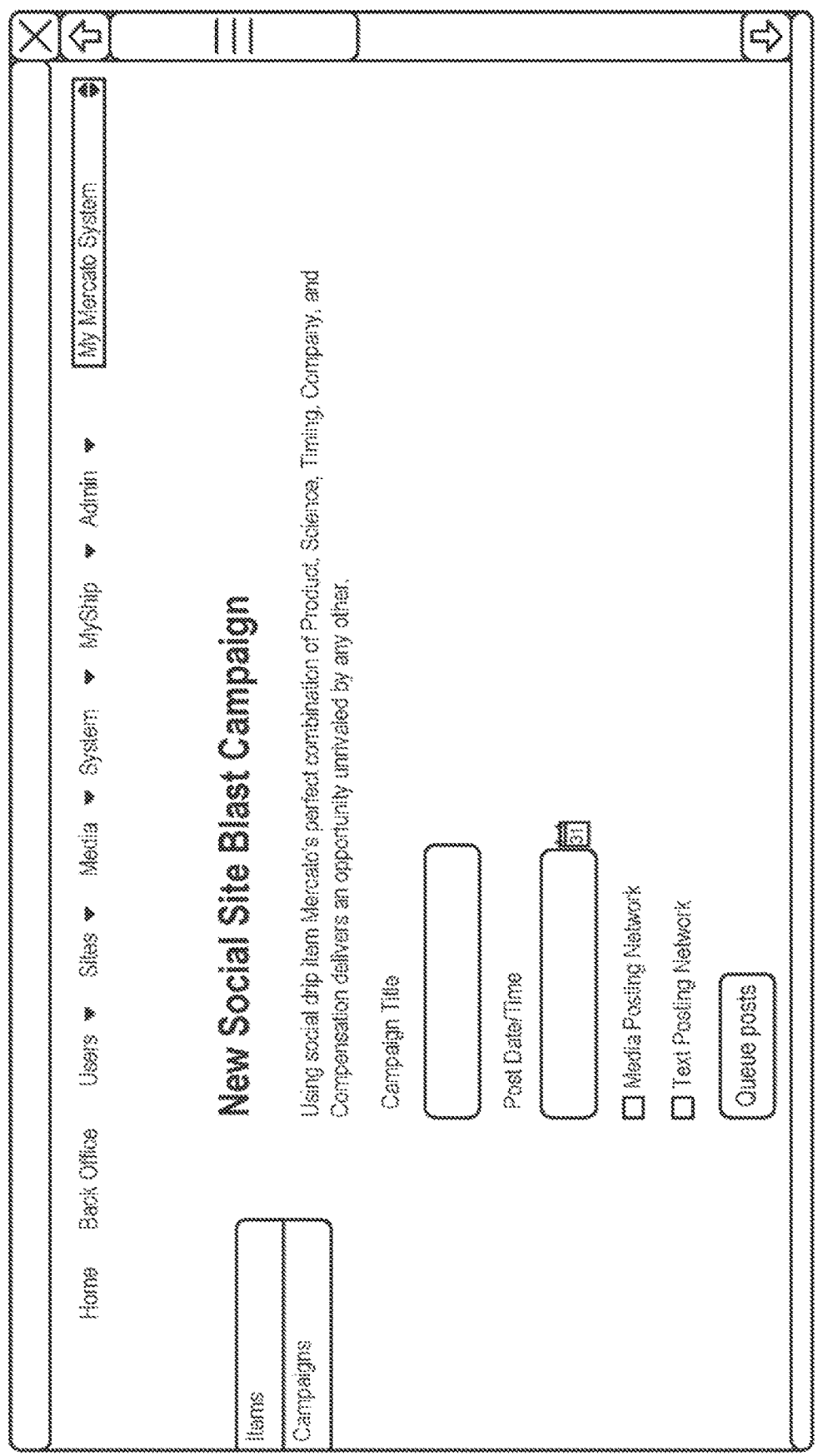
FIG. 25 illustrates one embodiment of a GUI for scheduling the distribution of one or more customized distributor content items with associated bi-directionally traceable links to a plurality of recipients via one or more distribution channels.

FIG. 25 illustrates one embodiment of a GUI 2500 for scheduling the distribution of one or more customized distributor content items with associated bi-directionally traceable links (i.e., V2 links) to a plurality of recipients via one or more distribution channels.

Figure 26:
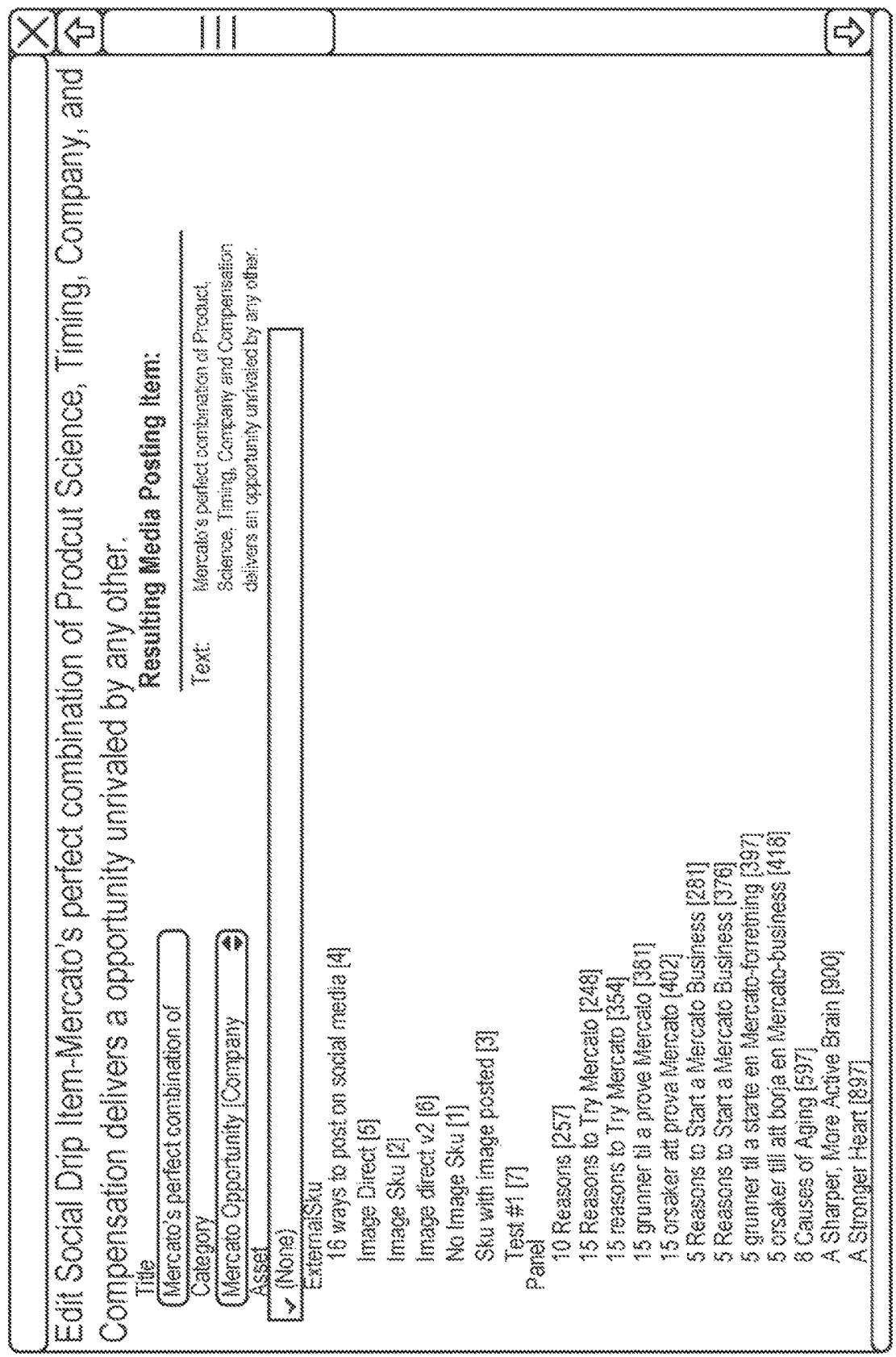
FIG. 26 illustrates one embodiment of a GUI for viewing and editing a customized distributor content item based on original distributor content and content items from the library of content items, including links to external content using bi-directionally traceable links.

FIG. 26 illustrates one embodiment of a GUI 2600 for viewing and editing a customized distributor content item based on original distributor content and content items from the library of content items, including links to external content using bi-directionally traceable links.

Figure 27:
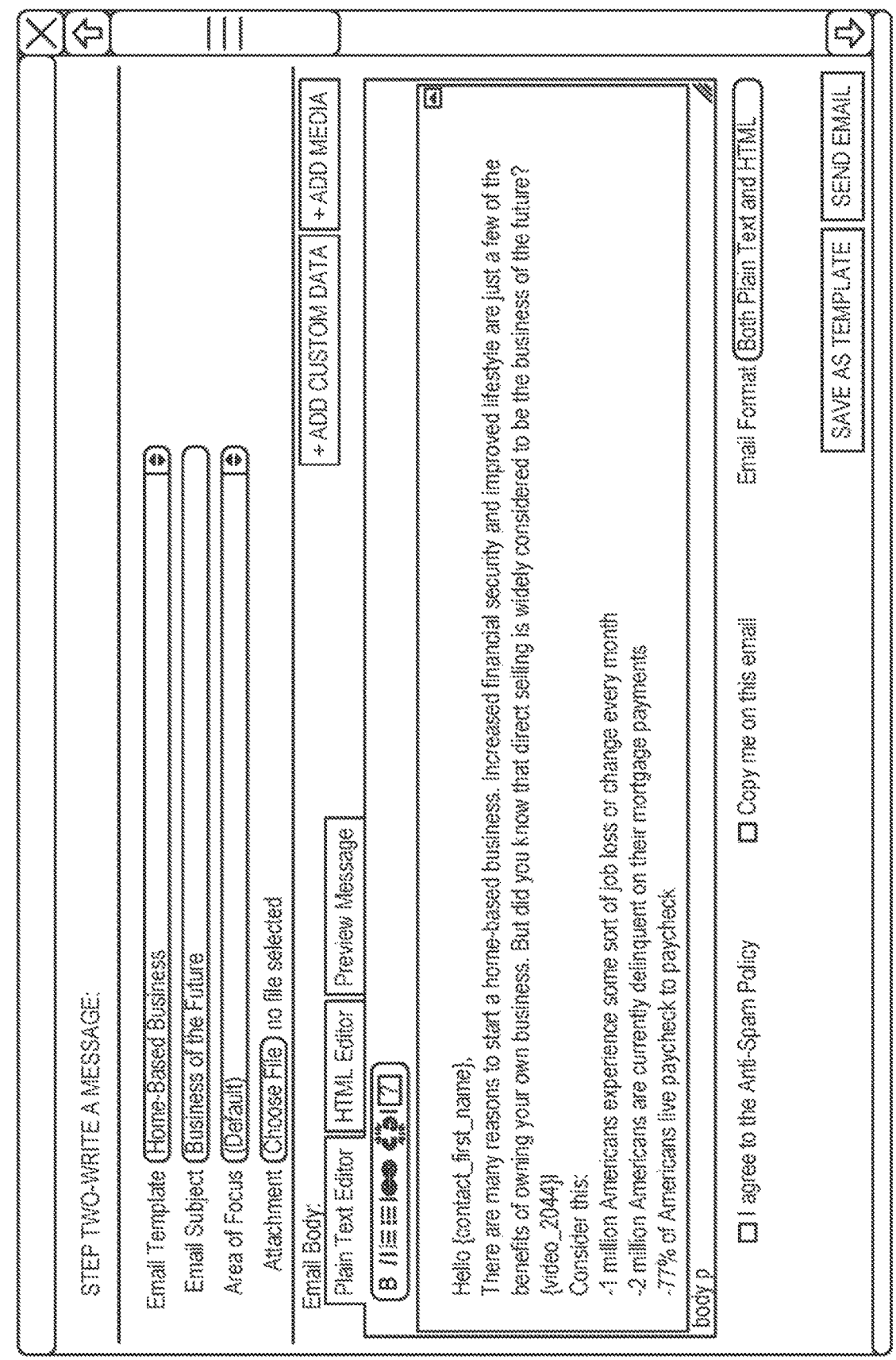
FIG. 27 illustrates one embodiment of a GUI for sending an email and an attached customized distributor content item with a shortened URL link that is bi-directionally traceable.

FIG. 27 illustrates one embodiment of a GUI 2700 for sending an email and an attached customized distributor content item with a shortened URL link that is bi-directionally traceable. As in previous embodiments, the V2 system may allow for mass distribution in a personalized manner and with unique V2 links for each sender-recipient combination.

Figure 28:
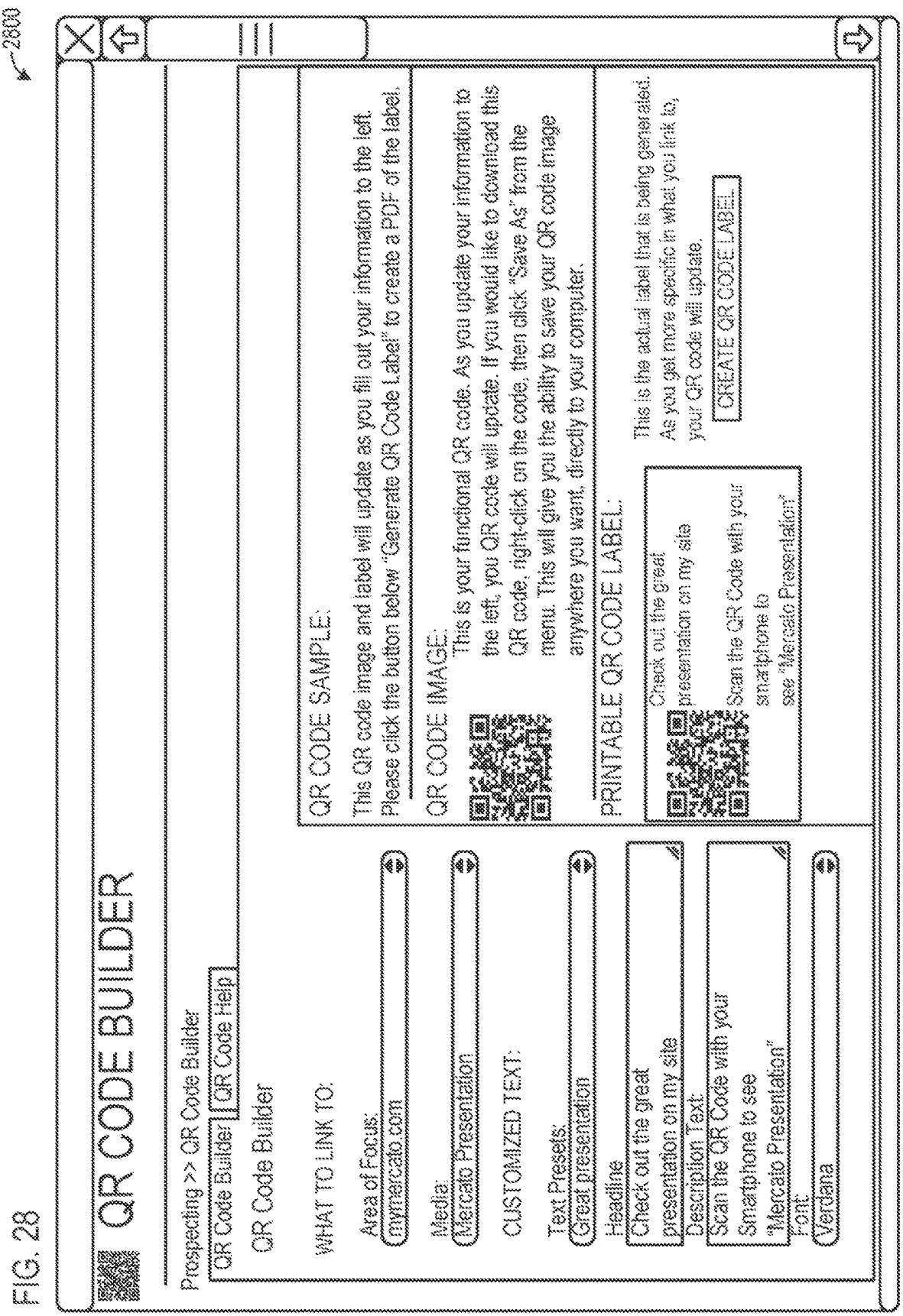
FIG. 28 illustrates one embodiment of a GUI in which the V2 links comprise QR codes instead of shortened URLs.

FIG. 28 illustrates one embodiment of a GUI 2800 in which the V2 links comprise QR codes instead of shortened URLs.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

The invention claimed is:

1. A method for facilitating digital communications using bi-directional links, comprising:
   receiving access at a central server system to a plurality of content items stored in a database;
   generating a plurality of electronically selectable unique links, where each unique link encodes a selection of one or more items from the plurality of content items and a recipient;
   transmitting each unique link to the recipient associated with the unique link;
   receiving at the central server system data indicating that a unique link has been electronically selected via the communications network;
   providing access to the one or more items from the plurality of content items associated with the selected unique link; and
   tracking the access to the one or more items from the plurality of content items by the recipient associated with the selected unique link by identifying the recipient encoded in the unique link.

2. The method of claim 1, wherein each unique link in the plurality of electronically selectable unique links further encodes a distribution channel.

3. The method of claim 1, wherein each unique link in the plurality of electronically selectable unique links further encodes a content provider associated with the one or more items from the plurality of content items associated with the unique link.

4. The method of claim 1, further comprising receiving at the central server system data describing a conversion action taken by the recipient associated with the selected unique link.

5. The method of claim 4, wherein the conversion action is the purchase of a product.

6. The method of claim 4, wherein the conversion action is transmitting a request for additional information via a communications network.

7. The method of claim 4, further comprising tracking a time delay between receiving the data indicating that the unique link has been electronically selected and receiving the data describing the conversion action.

8. The method of claim 4, wherein at least one of the one or more items from the plurality of content items is a video.

9. The method of claim 4, wherein each unique link is further associated with a distributor.

10. The method of claim 4, further comprising scheduling, using the central server system, the distribution of each unique link in the plurality of electronically selectable unique links to recipients.

11. The method of claim 4, wherein each unique link in the plurality of electronically selectable unique links is structured as a Universal Resource Locator (URL).

12. A digital communications system for generating and tracking bi-directional links, comprising:
   a central server system configured to:
      receive a plurality of content items stored in a database;
      generate a plurality of electronically selectable unique links, where each unique link encodes a selection of one or more items from the plurality of content items and a recipient;
      transmit each unique link to the recipient associated with the unique link via a communications network;
      receive at the central server system data indicating that a unique link has been electronically selected via the communications network;
      provide access to the one or more items from the plurality of content items associated with the selected unique link via the communications network; and
      track the access to the one or more items from the plurality of content items by the recipient associated with the selected unique link by identifying the recipient encoded in the unique link.

13. The system of claim 12, wherein each unique link in the plurality of electronically selectable unique links further encodes a distribution channel.

14. The system of claim 12, wherein each unique link in the plurality of electronically selectable unique links further encodes a content provider associated with the one or more items from the plurality of content items associated with the unique link.

15. The system of claim 12, wherein the central server system is further configured to receive data describing a conversion action taken by the recipient associated with the selected unique link.

16. The system of claim 15, wherein the conversion action is the purchase of a product.

17. The system of claim 15, wherein the conversion action is transmitting a request for additional information via a communications network.

18. The system of claim 15, wherein the central server system is further configured to track a time delay between reception of the data indicating that the unique link has been electronically selected and reception of the data describing the conversion action.

19. The system of claim 15, wherein at least one of the one or more items from the plurality of content items is a video.

20. The system of claim 15, wherein each unique link is further associated with a distributor.

21. The system of claim 15, wherein the central server system is further configured to schedule the distribution of each unique link in the plurality of electronically selectable unique links to recipients.

22. The system of claim 15, wherein each unique link in the plurality of electronically selectable unique links is structured as a Universal Resource Locator (URL).

* * * * *